(12) United States Patent
Matsuura et al.

(10) Patent No.: US 7,106,421 B2
(45) Date of Patent: Sep. 12, 2006

(54) METHOD OF ADJUSTING AXIAL DIRECTION OF MONITORING APPARATUS

(75) Inventors: Yoshio Matsuura, Kyoto (JP); Koji Horibe, Kyoto (JP)

(73) Assignee: OMRON Corporation, Kyoto (JP)

( * ) Notice: Subject to any disclaimer, the term of this patent is extended or adjusted under 35 U.S.C. 154(b) by 242 days.

(21) Appl. No.: 10/817,326

(22) Filed: Apr. 2, 2004

(65) Prior Publication Data

US 2004/0246471 A1  Dec. 9, 2004

(30) Foreign Application Priority Data

Apr. 4, 2003 (JP) .............................. 2003-102067

(51) Int. Cl.
G01C 3/08 (2006.01)
(52) U.S. Cl. .................... 356/4.01; 356/5.01; 356/3.01
(58) Field of Classification Search ................ 356/4.01
See application file for complete search history.

(56) References Cited

FOREIGN PATENT DOCUMENTS

JP  9-159759 A  6/1997

JP  2002074339 A  *  3/2002

* cited by examiner

Primary Examiner—Thomas H. Tarcza
Assistant Examiner—Luke D. Ratcliffe
(74) Attorney, Agent, or Firm—Beyer Weaver & Thomas LLP

(57) ABSTRACT

A method for a monitoring apparatus using a radar and a camera to detect an object. The radar and the camera each have its own detection area and the method is for detecting and correcting the displacement of each detection area by using a single target having dark and bright parts formed in a specified pattern on its surface and placing it in front of the apparatus where the two detection areas overlap. The direction and orientation of the detection area of the radar are measured and corrected and then the detection area of the camera is corrected. The pattern includes an elongated dark part flanked by a pair of bright parts such that quantity of reflected light obtained by scanning the detection surface has a distribution with waveform having two peaks and a valley in between and corrections on the detection areas are made by analyzing their positions.

14 Claims, 12 Drawing Sheets

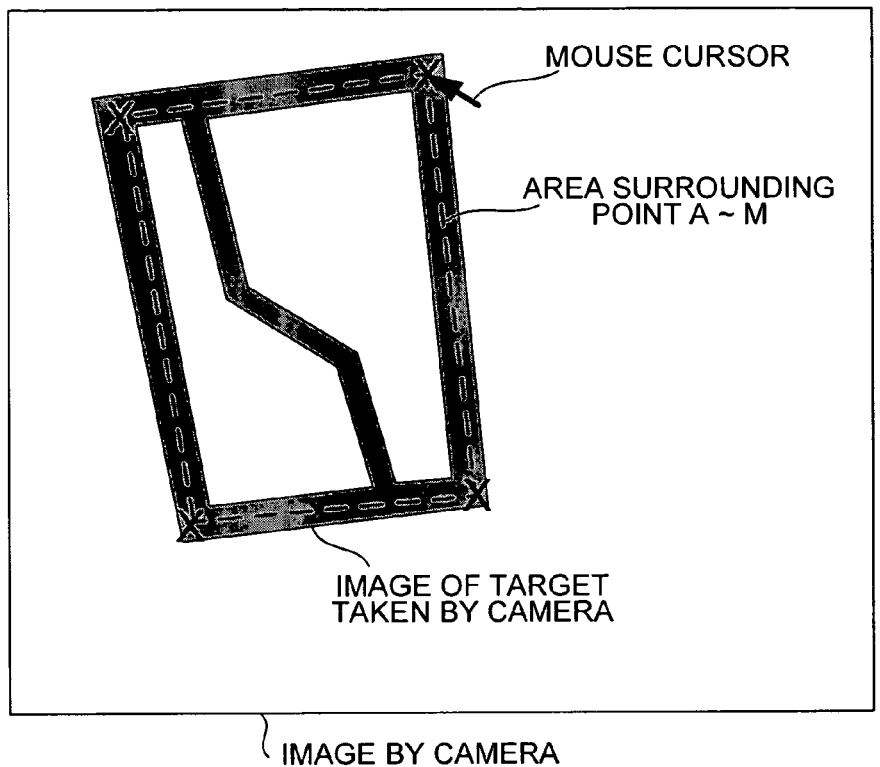
FIG. 6
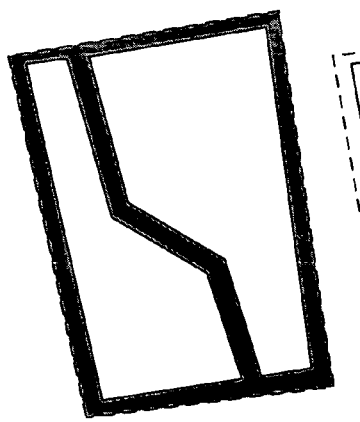
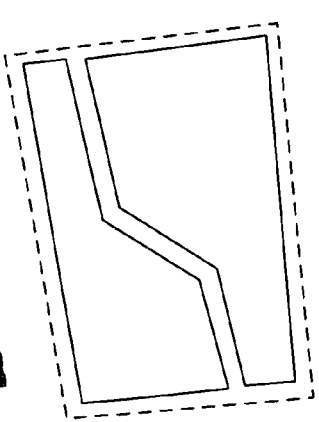
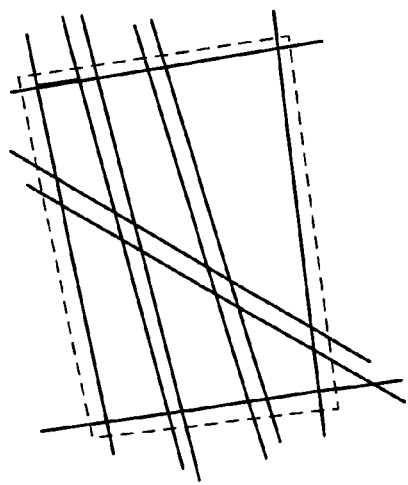
FIG. 7A  FIG. 7B  FIG. 7C

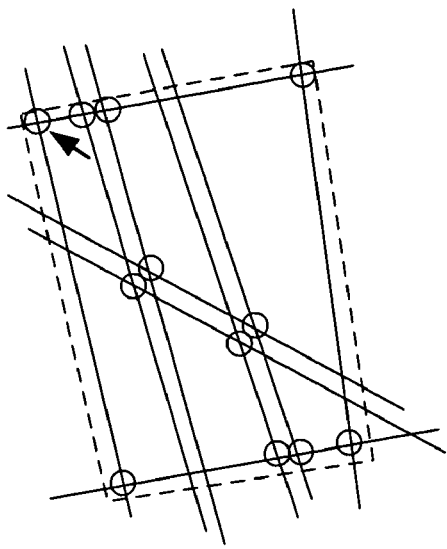
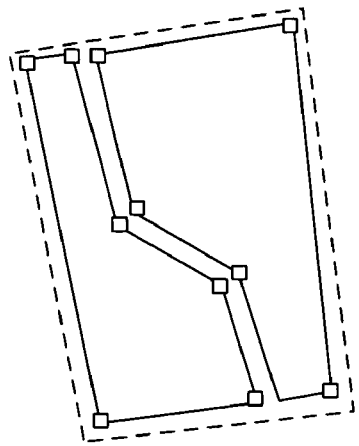
FIG. 8A  FIG. 8B
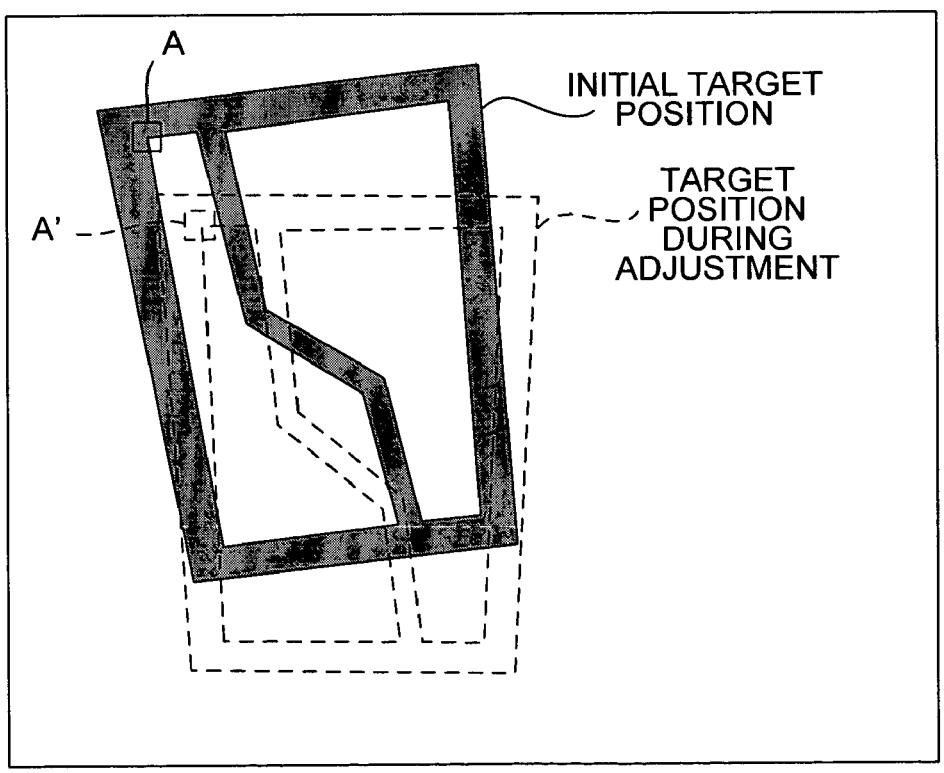
FIG. 9

METHOD OF ADJUSTING AXIAL DIRECTION OF MONITORING APPARATUS

BACKGROUND OF THE INVENTION

This invention relates to a monitoring apparatus such as a radar adapted to be mounted to a vehicle for using electromagnetic waves such as laser light to obtain position data of an object of detection such as a front-running vehicle and more particularly to a method of adjusting the orientation of its detection area, or its axial direction.

Apparatus of this type adapted to be mounted to a vehicle for monitoring front-running vehicles or for cruising (or car-following) control have long been in development and it has been known to use electromagnetic waves including laser light for this purpose, or an apparatus adapted to transmit electromagnetic waves such as laser light to a target object of detection within a specified detection area and to obtain data such as the distance to the object from the delay time of a reflected signal therefrom.

In the case of a laser radar, for example, a timing for light-emission is generated by a control circuit for transmitting laser light to a specified scan area, scanning it normally in one scan direction (usually in the left-right direction) to obtain a delay time with reflected light. A counter is started according to this timing and a laser diode (LD) is driven at the same timing to transmit laser light. The reflected light from a light-reflecting object is received by a photodiode (PD) and if reflected light with intensity greater than a threshold level determined by a signal processor is detected, its timing is used by the control circuit, the counter is stopped and the delay time is calculated. The direction to the object can also be determined from the scan angle at the time of the laser light transmission or when the reflected light is received.

The relative speed of the object can also be calculated by grouping measured individual data on the distance and direction to the object, the quantity of received light and the speed of the subject vehicle obtained from its own speedometer, and correlating them with the data obtained earlier. It can thus be determined whether the detected object was a vehicle, a bicycle, a pedestrian, a billboard or a roadside reflector, and an object to be monitored, or to be warned about, can be identified.

Monitoring apparatus mounted to vehicles for monitoring the distance to a front-running vehicle by using an image sensor such as a CCD camera (hereinafter referred to simply as a camera) have also been known. They are adapted to receive vibrations (usually visible light) from a specified detection area around the subject vehicle by means of an image sensor and to analyze the existence and position of any target object within the detection area such as another vehicle from the distribution of darkness on the image of the detection area based on the received signals.

More recently, monitoring apparatus of the so-called fusion type, making use of both a radar and a camera, are coming to be developed because a radar and a camera can each make up for the shortcomings of the other.

A monitoring apparatus as described above using a radar or a camera is usually mounted so as to have an ideal detection area extending both to the left and to the right at the height at which it is mounted. If the actual detection area of the apparatus (that is, the area from which reflected light is actually received) is displaced, the reliability of the detection result is accordingly lowered. Thus, it is a necessary work on the production line of vehicles and at the inspection time at a repair factory to adjust the position of the center of the detection area (called the optical axis adjustment in the case of a laser radar) such that the monitoring apparatus can be maintained in a condition without such displacement.

A prior art method of adjusting the position and orientation of a detection area (hereinafter sometimes referred to as the axial adjustment) is explained next. FIG. 15A shows an example of method of adjustment in the direction (usually the vertical direction) perpendicular to the standard scan direction (usually the horizontal direction). By this method a standard (reference) reflector is set with respect a stationary vehicle having the apparatus mounted to, for example, at a position on the upper limit of its proper detection area. An environment is prepared such that there is no external disturbance and as few objects as possible other than this reflector will be detected. The laser radar is actually operated under this condition and the vertical angle of the detector head of the laser radar is gradually changed downward manually. As the reflector ceases to be detected, the angle and the position of the detector head are fixed again manually.

For the adjustment in the normal scan direction (usually the horizontal direction), the reflector is placed at the center of the ideal detection area with respect to the stationary vehicle, as shown in FIG. 15B. After the environment is again prepared such that there is no external disturbance and as few objects as possible other than the reflector will be detected, the laser radar is operated and the angle and the position of the detector head are physically adjusted or a software parameter in the control system is modified by an operation of the control system such that the position data of the detected reflector will come to the center of the detection area.

The actual scan area of such a monitoring apparatus to be mounted to a vehicle is set, as shown in FIG. 15B, to be greater than the detection area from which reflected light is received for obtaining distance data, etc. as explained above. Adjustment of the position of the detection area in the scan direction is possible without physically changing the attachment position of the detector head of the apparatus but by varying a software parameter within the scan area of this detection area (or within a detection-allowing area by including some safety margin). The position of the scan area and the detection area can also be adjusted to a certain extent in the scan direction by changing a software parameter for the control of the range of operation of a scan mechanism such as the motor for the scanning.

Japanese Patent Publication Tokkai 2000-75031 disclosed a method of adjusting the axial direction both in the standard direction and the perpendicular direction in a short time by using a same target, overcoming the disadvantages of the methods shown in FIGS. 15A and 15B. Japanese Patent Publications Tokkai 11-326495, 11-64489 and 7-225277 disclosed methods of axial adjustment of a radar in the horizontal or perpendicular direction. Japanese Patent Publications Tokkai 2002-74339 disclosed a method of setting a special mark at the front end of an automobile and using it to adjust the direction of a camera. Japanese Patent Publication Tokkai 2000-142221 disclosed an adjustment method by obtaining a specified image.

All of these prior art adjustment methods are for adjusting the center axis of a detection area in two directions such as the horizontal and perpendicular directions and did not consider the displacement in the rolling direction, or the rotational displacement. By the displacement in the rolling direction is meant the tilting from a proper orientation of the detection area (in which the standard direction is horizontal).

For this reason, even after the axial direction is adjusted by a prior art method, a significantly large error could take place between the measured position by the monitoring apparatus and the actual position near the edge of a detection area because of such displacement in the rolling direction. In the case of an ordinary radar device mounted singly to a vehicle, adapted to scan only in one dimension (usually in the horizontal direction), since the perpendicular direction is not important, the displacement in this rolling direction was not a serious problem. In the case of a monitoring apparatus of the fusion type, making use of a plurality of sensors (such as a radar and a camera), however, correlation between measured data obtained by the individual sensors must be correct in order to take proper advantage of the characteristic of the fusion type. Thus, the axial deviation in the rolling direction must be adjusted and kept small.

Moreover, since different targets are used individually for the axial adjustments of the radar and the camera by a prior art method, there was the following problem in the case of a fusion type which uses both a radar and a camera at the same time.

If the prior art method of axial adjustment is applied to the fusion type, there is the possibility that the relative positional relationship between the radar and the camera may become inappropriate (with the axes of the detection areas of the two sensors not being parallel or with the two sensors oriented differently with respect to the rolling direction) due to errors in the positions at which the targets or marks are set. It is because there may be an error in the positioning of each target with respect to the vehicle that these errors accumulate between the sensors. It is also because the displacement of each of the sensors from the direction of rolling is not adjusted that the orientations of their detection areas do not match in the direction of the rolling. If the relative positional relationship between the two sensors remains thus incorrect, correlation between observed data by the two sensors used in the fusion method cannot be taken properly and this means that there is no advantage in using the fusion method.

It is therefore an object of this invention to provide an improved method of axial adjustment or a method of adjusting in the rolling or rotational direction of a monitoring apparatus especially of the fusion type.

SUMMARY OF THE INVENTION

The invention relates to an adjusting method for a monitoring apparatus having a detection area associated therewith for use in a measurement operation by receiving reflected waves such as light from the detection area and outputting data for specifying at least a position of an object of detection in the detection area at least from the quantity of the received waves. The adjustment is made for the displaced axis of the detection area in its rolling direction and the method of this invention is characterized as comprising the steps of preparing a target for use in the adjustment, setting it property, obtaining the axial displacement by measurements and correcting the displacement.

The target to be used according to the invention is characterized as having a detection surface with a specified outer shape, a bright part with a higher reflectivity for waves and a dark part with a lower reflectivity for waves (than the higher reflectivity of the bright part) being arranged over the detection surface in a specified pattern such that a waveform of wave quantity having a double-peaked shape (with the peaks either pointing downward such as a W-shape or upward such as an inverted W-shape) corresponding to the pattern of the dark and bright parts and possibly also to the outer shape of the detection surface is obtained with respect to a certain position (or the standard position) in a so-called standard direction (usually the left-right direction) if the measurement operation is carried out in the standard direction by directing the detection area of the monitoring apparatus towards the detection surface.

The target thus characterized is placed in front of the monitoring apparatus such that the standard direction of the detection surface is matched with what is expected to be the standard direction of the detection area. If necessary, the environmental condition of the target is set such that its reflectively will be about the same as that of the dark part or the bright part in the pattern on the detection surface of the target.

Next, the aforementioned measurement operation is carried out at least twice, each time changing the position of the measurement in a direction perpendicular to the aforementioned standard direction. Axial displacement of the detection area in the rolling direction (or the rotational direction) is thereby obtained, and a standard position of the detection surface in the standard direction is calculated from the obtained waveform.

If necessary, the attachment angle of the monitoring apparatus is changed or a parameter for setting the detection area is changed in order to correct the axial displacement thus determined.

By such a method according to this invention, axial displacement of the monitoring apparatus in its rolling direction can be corrected easily because if there is an axial displacement to be correct, the aforementioned standard position on the target will come to be observed at a different position as the position of measurement is changed in the perpendicular direction. Since the observed position changes according to the magnitude of the displacement, the axial displacement can be easily corrected and the accuracy of the monitoring apparatus can be significantly improved.

In the above, the monitoring apparatus may be a type having only a radar as its sensor or a type having both a radar and a camera. Regarding the target, its detection surface should at least have a specified pattern of bright and dark areas. In some situations, its outer peripheral shape may become important, depending on whether or not the background reflectivity is arranged or not. Regarding the double-peaked waveform (whether in a W-shape or an inverted W-shape), it is sufficient if it is obtainable when the amount of axial displacement is in excess of a specified threshold value. It is also sufficient if the observed portion of the waveform includes a double-peaked shape.

In the above, the standard position means any selected position defined along its standard direction, such as a center position in the standard direction.

Four kinds of acceptable target shape may be considered. One of them may be characterized, as will be explained below with reference to FIGS. 2C and 14B, wherein the outer shape of the detection surface includes a pair of side edges that are parallel to the perpendicular direction, wherein the width of the detection surface in the standard direction (as indicated as L1 in these figures) is smaller than the width of the detection area in the standard direction, wherein the pattern on the detection surface includes an elongated area extending over a center part of the detection surface and a pair of flanking areas on both sides of the elongated area, and wherein either this elongated area is bright and the flanking areas are dark or the other way around. In the above, the elongated area extending over the center part of the detection surface need not but is preferable to be diagonally extending because a single target thus designed can be used to detect the displacement both in the standard and perpendicular directions. This statement applies alto to targets of the second kind discussed below.

A target of a second kind may be characterized, as will be explained below with reference to FIGS. 14A and 14B, wherein the pattern on the detection surface includes an elongated area extending over a center part of the detection surface, a pair of flanking areas on both sides of the elongated area and a pair of background areas on both sides of the flanking areas in the standard direction, wherein either this elongated area is bright and the flanking and background areas are dark or the other way around, and wherein boundaries between the flanking and background areas on both sides in the standard directions are parallel to the perpendicular direction, and wherein the separation between these mutually parallel boundaries (as indicated as L1 in these figures) is smaller than the width of the detection area in the standard direction.

A target of a third kind may be characterized, as will be explained below with reference to FIG. 13A, wherein the detection surface has a smaller width (as indicated as L1 in the figure) in the standard direction than the detection area, wherein the pattern includes an elongated area extending over a center part of the detection surface in the perpendicular direction and a pair of flanking areas on both sides of the elongated area, wherein either this elongated area is bright and the flanking areas are dark or the other way around. The outer shape of the detection surface is not limited if only the axial displacement in the rolling direction is to be detected but it is very convenient if it has mutually parallel edges that are oblique to the perpendicular direction because the same target can be used for detecting displacements both in the standard and perpendicular directions.

A target of a fourth kind may be characterized, as will be explained below with reference to FIG. 13B, wherein the pattern includes an elongated area extending over a center part of the detection surface, a pair of flanking areas on both sides of the elongated area and a pair of background areas on both sides of the flanking areas in the standard direction, wherein either this elongated area is bright and the flanking and background areas are dark or the other way around, wherein boundaries between the flanking and background areas on both sides in the standard direction are separated by a distance that is smaller than the width of the detection area in the standard direction, wherein the elongated area is parallel to the perpendicular direction, and wherein the standard position is calculated from standard direction position data at the valley of the double-peaked shape (whether in a W-shape or in an inverted W-shape). The direction of the boundaries between the flanking and background areas is not limited if only the axial displacement in the rolling direction is to be detected but it is very convenient if they are mutually parallel and oblique to the perpendicular direction because the same target can be used for detecting displacements both in the standard and perpendicular directions.

If a target of the first or second kind is used, a double-peaked (either W-shaped or inversely W-shaped) waveform can be obtained easily because if, for example, the elongated area is dark, the flanking areas are bright and the background areas or the environment is dark, the waveform will have a dip at the position (c) of the dark elongated part, reach a peak at the position of each of the flanking areas and drop again at the positions (a and b) of the background areas or the environment of the target. From these data, the aforementioned standard position can be calculated, say, as (a+b)/2 because this average value represents the center position between both side edges of the detection surface, or a fixed position on the detection surface.

A double-peaked waveform can be obtained equally easily by using a target of the third or fourth kind and the standard position can be obtained from c (as defined above) because the elongated area is formed so as to cross the center of the detection surface.

The difference between the first and second kinds and between the third and fourth kinds may be explained as follows. The first and the third kinds are characterized wherein the outer edges of the flanking areas are used as the outer edges of the detection surface. Thus, although the environmental condition must be adjusted such that the reflectivity of the environment will be about equal to that of the elongated area at the center, the detection surface may be made relatively compact. The second and the fourth kinds are characterized wherein background areas having the same reflectivity as the elongated area at the center are provided as areas within the detection surface. Thus, a desired waveform can be obtained independent of the environmental condition of the target. Although it is disadvantageous in that the detection surface becomes relatively large, there is the advantage that the reflectivity of the environment need not be adjusted.

Another method of axial adjustment according to another embodiment of this invention relates to a monitoring apparatus for carrying out a measurement operation by receiving waves from a first detection area in each of standard directional positions and comprising a radar that outputs data for determining at least the position of an object in the first detection area at least from the quantity of received radar waves and a camera for obtaining an image of a second detection area that overlaps with the first detection area, and the method is for adjusting orientations of the first and second detection areas and may be characterized as comprising the steps of setting a single target in an overlapping area where the first and second detection areas overlap and adjusting the first detection area based on results of measurement on the target by the radar and thereafter detecting axial displacement of the second detection area based on an image of this target taken by the camera, adjusting the second detection area and obtaining a parameter for coordinate transformation between the radar and the camera.

In the description above of the second method according to the invention, the monitoring apparatus is of the kind having two sensors, that is, both a radar and a camera and the first detection area and the second detection area are respectively the detection area of the radar and the camera. The parameter for coordinate transformation means a parameter for correctly correlating the position data by the two sensors. Details about the target and the adjustment of the first detection area may be as described above regarding the first embodiment of the invention except axial adjustments in the normal standard direction and the perpendicular direction may have to be carried out in addition to an adjustment in the rolling direction as will be explained below.

By a method according to the second embodiment of the invention, adjustments on the axes of the two sensors of a monitoring apparatus of the fusion type can be carried out easily and quickly by using a single target such that position data from the two sensors can be accurately correlated. For example, a radar can detect the presence or absence of an object and the distance thereto without carrying out any complicated image processing process but cannot easily distinguish its shape while a camera can distinguish the shape of an object but is required to carry out a complicated image processing process. If they are used together after their axes are accurately correct, however, accurate data can be obtained effectively on an object, for example, by cutting out the image of a small object from a larger image taken by the camera and carrying out an image processing process with an emphasis on the smaller object that has been cut out.

In the method according to the second embodiment of the invention, a preferred way of obtaining the parameter is by the steps of detecting a plurality of so-called characteristic points on the detecting surface of the target from the image taken by the camera, determining coordinates of these characteristic points on the image, and determining axial displacement of the second detection area based on these determined coordinates. This may be carried out by a processor such as a microcomputer that may be set either inside or outside the monitoring apparatus. This manner of carrying out the method is advantageous because the displacement is automatically determined and hence the accuracy of the adjustment is improved.

It is also preferable to use this processing device to determine the coordinates of the characteristic points on the image by causing the image taken by the camera to be displayed on a display, determining a cut-out image of a specified region containing the characteristic points on the display according to an input by a user, and carrying out an image processing on the cut-out image. By such a method, the area of the image processing for extracting the characteristic points can be reduced and hence the time required for the processing can be reduced accordingly.

In the above, it is further preferable to extract the characteristic points at angles and/or corners of boundary lines of a brightness-darkness pattern formed on the detection surface of the target and wherein the processing device further carries out an image processing to thereby extract straight lines from the image of the target taken by the camera and the steps of having the extracted straight lines displayed on a display and thereafter determining coordinates on the image of those of crossing points of the straight lines indicated by a user. In this manner, there is no need for any special extraction filter for edge and corner detection because a simpler process for extracting straight lines is utilized and hence the time for the processing can be further reduced.

When the second detection area is adjusted as explained above (say, by physically changing the direction of attachment of the camera), it is preferable to register as a template an image of the environment of the characteristic points on the image of the target before adjustment and to search on the image of the template by normalized cross-correlation process to thereby obtain new coordinates of the characteristic points on the image after the adjustment from the image of the target after the adjustment. This manner of carrying out the method is convenient because the current orientation of the optical axis of the camera (after adjustment) can be calculated without carrying out any image processing like the one before the adjustment.

Another way of adjusting the axial displacement is to use the processing device as described above to obtain axial displacement data related to axial displacement of the first detection area or the second detection area based on the results of measurement by the radar or the image of the target taken by the camera, to cause the displacement data to be displayed on a display, and to cause a user to change the first detection area or the second detection area while observing the display until the axial displacement of the first detection area or the second detection area comes to be within a specified range. Although this method involves the work of the user, since the user can make the adjustment while observing the data on the display, a highly developed skill is not required for the work and a correct adjustment can be effected relatively easily and inexpensively.

In methods according to both the first and second embodiments of the invention, it is desirable to make use of a control device for the radar and/or the camera of the monitoring apparatus such that axial detection operations can be carried out automatically and also a processing device for automatically adjusting the position and orientation of the attachment of the monitoring apparatus or changing the parameter for the detection area such that the entire adjustment operations can be automated although some simple operations such as specifying a range and specifying crossing points may be done by a user. In such a case, the user has only to give a command after carrying out a simple operation such that complicated adjustments in the perpendicular direction need no longer be done by a person. Thus, the present invention contributes significantly to improving, for example, the efficiency in mass production of vehicles.

BRIEF DESCRIPTION OF THE DRAWINGS

FIG. 6 is an example of image obtained of a target.

FIGS. 7A, 7B, 7C, 8A and 8B are drawings for explaining the process of extracting characteristic points from a target image.

FIG. 9 is a drawing for explaining the process of referencing a characteristic point.

DETAILED DESCRIPTION OF THE INVENTION

Figure 1A:
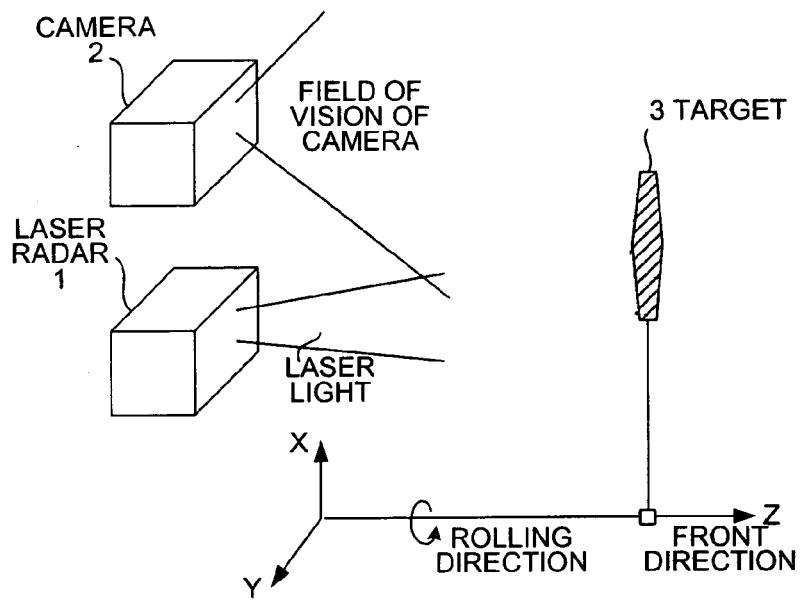
FIGS. 1A and 1B are respectively a drawing for showing the main structure of a system including a monitoring apparatus embodying this invention and a block diagram of the control system of the monitoring apparatus.
Figure 1B:
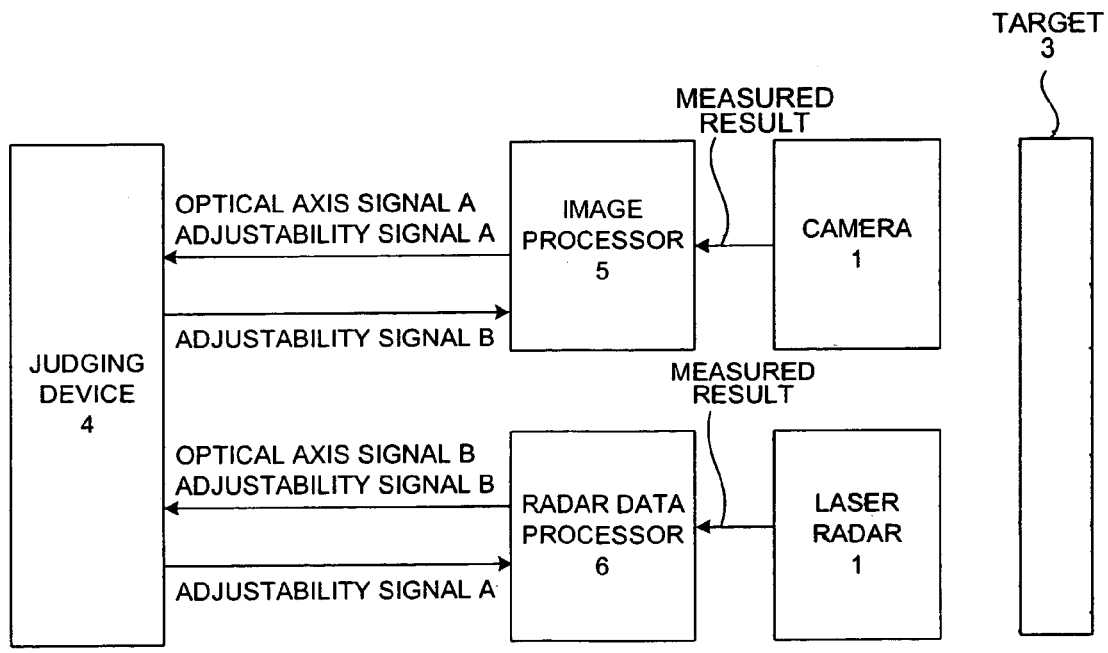
Figure 2A:
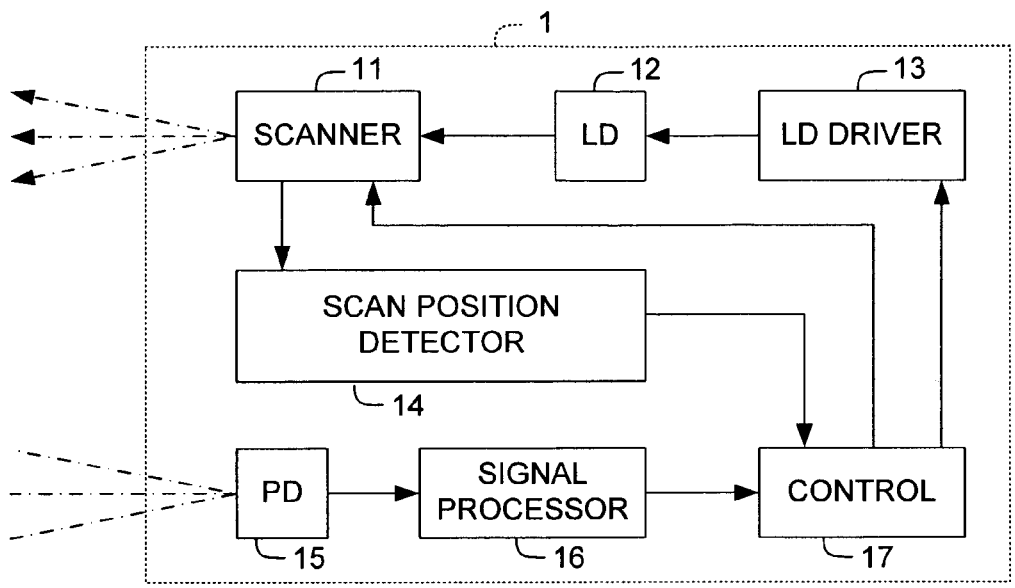
FIGS. 2A, 2B and 2C are respectively a block diagram of the laser radar, a drawing for explaining the principle of measurement by the laser radar, and a front view of a target.
Figure 2B:
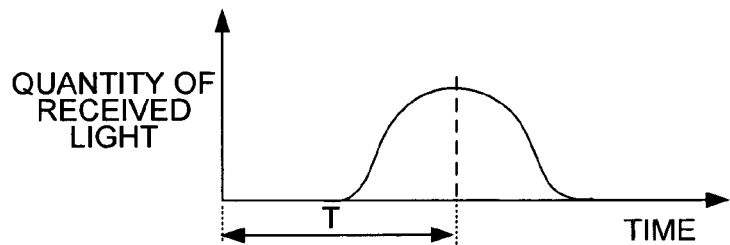
Figure 2C:
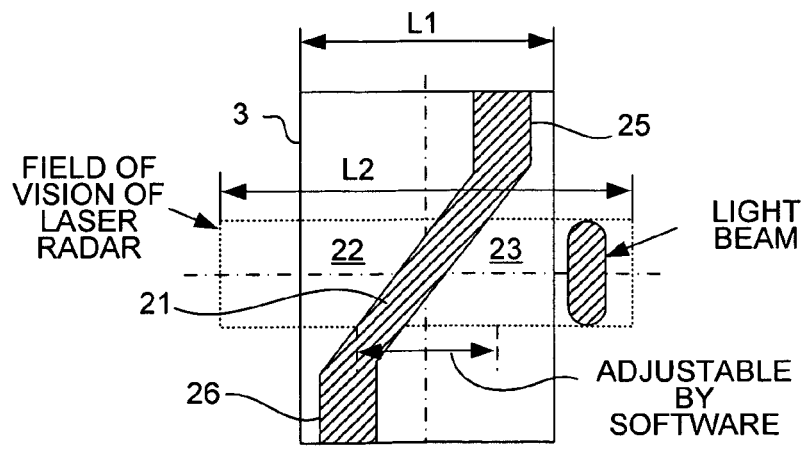

FIGS. 1A, 1B, 2A, 2B and 2C show the structure of a system including a monitoring apparatus provided with a laser radar and a camera to be mounted to a vehicle on which a method embodying this invention may be carried out, FIG. 1A showing its main structure, FIG. 1B being a block diagram of the control system of the monitoring apparatus, FIG. 2A being a block diagram of the laser radar, FIG. 2B being a drawing for explaining the principle of measurement by the laser radar, and FIG. 2C being a front view of a target used for the adjustment.

FIG. 1A shows a laser radar (hereinafter referred to simply as the radar) 1 and a camera 2 both mounted to a vehicle. The radar 1 is of a type for scanning both in the horizontal and vertical directions (respectively the standard and perpendicular directions). Numeral 3 indicates a target used for the adjustment. X, Y and Z in FIG. 1A indicates a coordinate system fixed to the vehicle, the X-axis being in the vertical direction, the Y-axis being in the horizontal direction and the Z-axis being the forward direction as seen from the vehicle. The direction of rotation around the Z-axis is the rolling direction.

The control system of the monitoring apparatus includes, as shown in FIG. 1B, a judging device 4, an image processing device 5 and a radar data processing device 6.

The image processing device 5 is an element for carrying out image processing of the result of measurement (image data) by the camera 2 and serves to determine presence or absence of an object at the time of a normal operation and to output optical axis data A (data on the displacement of the axis of the camera 2) and adjustability signal A at the time of an axial adjustment.

The radar data processing device 6 is an element for determining presence or absence of an object at the time of normal operation on the basis of measurement by the radar 1 and serving to output optical axis data B (data on the displacement of the axis of the radar 1) and adjustability signal B at the time of an axial adjustment. The radar data processing device 6 and the control circuit 17 (shown in FIG. 2A and to be explained below) may be integrally formed as a single circuit.

The judging device 4 is adapted to make final judgments on the position and type of a target object on the basis of the data outputted from the image processing device 5 and the radar data processing device 6 at the time of a normal operation and to receive and transmit the adjustability signals A and B at the time of an axial adjustment.

Aforementioned adjustability signal A indicates, on the basis of the result of measurement by the camera 2 (that is, the image taken by the camera 2), whether or not its axial adjustment is impossible, for example, because the target 3 is not set, the darkness pattern of the target 3 is incorrect, the target 3 is excessively tilted, or the target 3 is not visible in its entirety due to a worker or an object obstructing the view. Similarly, adjustability signal B indicates, on the basis of the result of measurement by the radar 1, whether or not its axial adjustment is impossible, for example, because the distance to the target 3 is abnormal.

Figure 10:
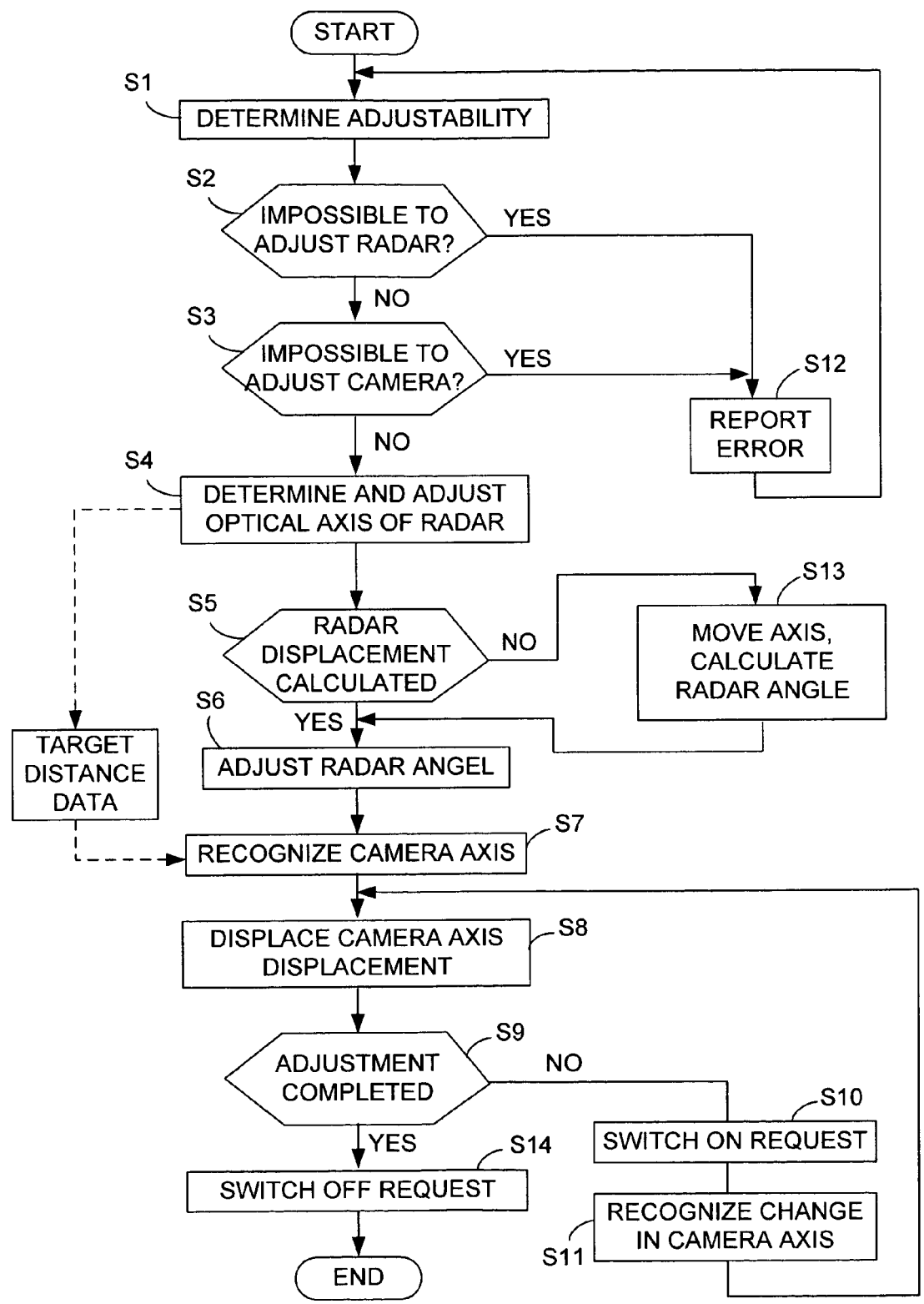
FIG. 10 is a flowchart of the main routine for adjusting axes.

The judging device 4, the image processing device 5 and the radar data processing device 6 may be formed as a circuit including either one common microcomputer or individual microcomputers. Such a circuit forming these devices may be made connectable to an external display device for a display at the time of carrying out an axial adjustment or a personal computer including an external display device. A command inputting device such as comprising operating switches (not shown) is also connected to the circuit of these devices for allowing a user to operate thereon in order to transmit commands to the circuit or to the control circuit 17 to be described below for causing them to carry out processes of an axial adjustment (such as shown in FIG. 10). Such commands may be adapted to be entered instead by the operation on the keyboard or of the mouse of the personal computer that has been connected. The aforementioned processes of axial adjustment (such as shown in FIG. 10) may be carried out also by utilizing the processing functions of the connected personal computer.

As shown in FIG. 2A, the radar 1 is comprised of a scanner 11, a laser diode (LD) 12, a LD driver circuit 13, a scanning position detector 14, a photodiode (PD) 15, a signal processor 16 and a control circuit 17. The aforementioned detector head of the radar 1 includes the laser diode 12, the scanner 11 and the photodiode 15.

The scanner 11 is an element serving to use reflecting mirrors or the like to scan the laser light outputted from the laser diode 12 both horizontally and vertically over a scan area, operating periodically at a specified timing and with a specified period under the control of the control circuit 17.

The LD driver circuit 13 is also under the control of the control circuit 17 and serves to activate the laser diode 12 at the timing generated by the control circuit 17 to cause laser light to be emitted.

The scanning position detector 14 is an element for detecting the scan direction of the scanner 11 and to transmit a scan direction signal indicative thereof to the control circuit 17.

The photodiode 15 is for receiving reflected laser light returning from a target object and outputting an electric signal (or a light quantity signal) indicative of the quantity of the received light. The light quantity signal outputted from the photodiode 15 is inputted to the control circuit 17 through the signal processor 16.

The control circuit 17 (or also the aforementioned radar data processing device 6) may be formed by a microcomputer. At the time of a normal operation, it carries out a measuring operation basically by controlling the scanner 11 and the LD driver circuit 13, calculating the distance to an object of detection from the delay time T of propagation from the emission of light until its reception, judging the direction to the object based on the scan direction at the time, determining the quantity of received light from the quantity of the received light (or the size of the aforementioned light quantity signal), distinguishing the type of the object and its motion from these data (on the distance, direction and light quantity) and outputting detection signals including data on the size, type and position of the object.

Reflected light corresponding to one pulse of emitted light is not always received all at once. Since the emitted light has a finite spread, reflected light with different timing and intensity is received. Thus, with an apparatus of the type being described, the sampled waveform outputted from the photodiode PD 15 may be as shown in FIG. 2B and an averaging process may be carried out (say, by selecting a plurality of points near the peak of received light quantity and obtaining the center of gravity of these points) to determine the delay time T. The sampled value of the received light corresponding to the delay time T thus obtained may be identified as the quantity of the received light.

Figure 15A:
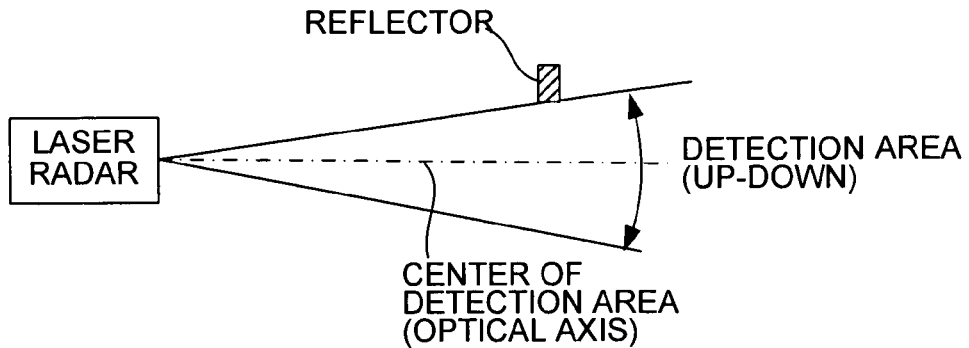
FIGS. 15A and 15B are drawings for explaining a prior art method of axis adjustment.
Figure 15B:
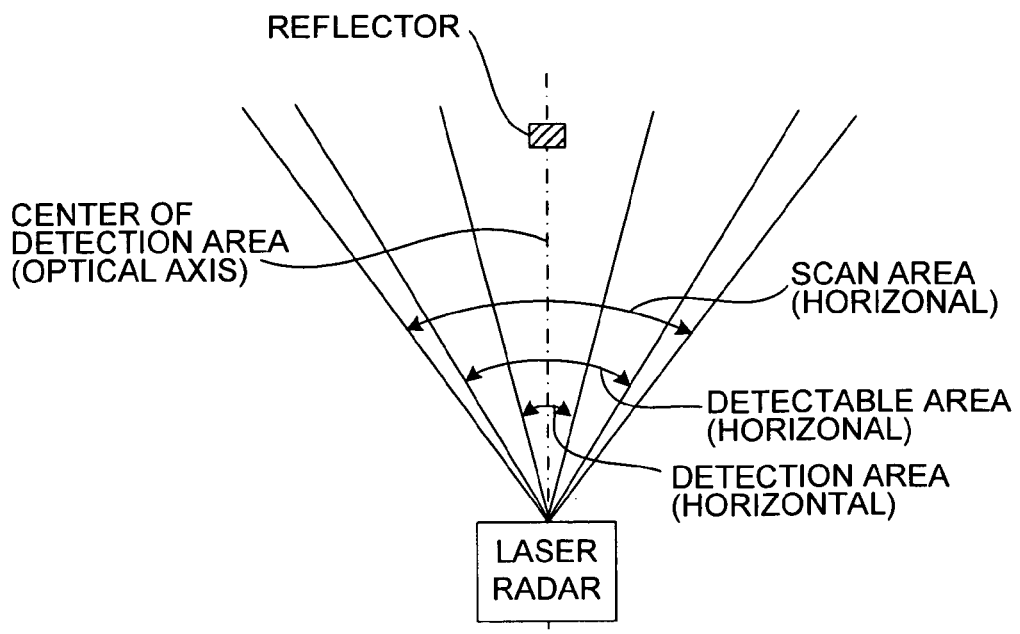

In this example, too, as explained with reference to FIG. 15B, the scan area actually irradiated by laser light is set larger than the detection area in which reflected waves are received and distance and other data are obtained. Adjustment of the position of the detection area of the radar 1 ("the first detection area") in the left-right direction is possible without physically changing the attachment position of the detector head of the apparatus but by varying a software parameter within the scan area of this detection area (or within a detection-allowing area by including some safety margin). The position of the scan area and the detection area can also be adjusted to a certain extent in the scan direction by changing a software parameter for the control of the range of operation of a scan mechanism such as the motor for the scanning. Since the radar 1 in this example is of a two-dimensional scanning type, axial adjustment by software is possible also in the vertical direction and the direction of rolling. In what follows, the range within which axial adjustment by software is possible is referred to as the adjustable range by software. The extent of the detection area of the radar 1 on the plane along the detection surface of the target 3 is hereinafter referred to as the radar field of vision, as shown in FIG. 2C.

Next, the adjustment of the optical axis on the system described above will be explained. Such adjustment is carried out with the vehicle carrying the system kept stationary.

Figure 3A:
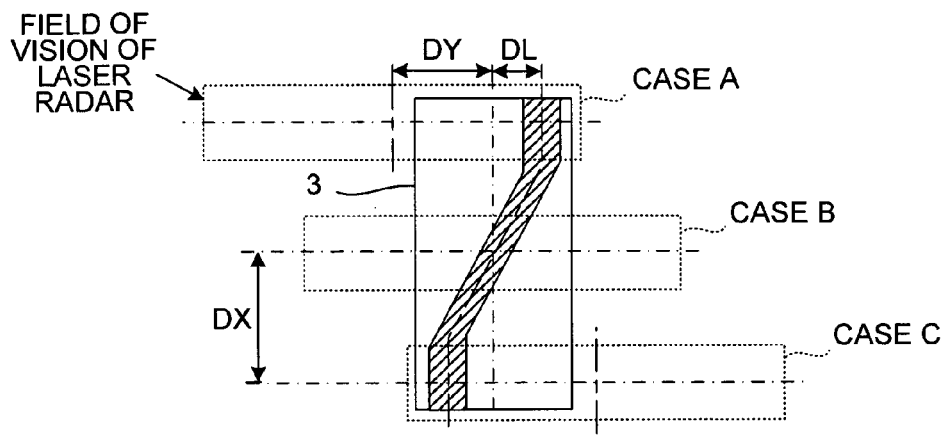
FIGS. 3A, 3B, 3C and 3D are for explaining the waveform of light received by the radar, FIG. 3A being a front view of a target, and FIGS. 3B, 3C and 3D being waveforms of light received by the radar.

A target 3 for adjustment as shown in FIG. 2C or 3A is placed in front of the vehicle to which the radar 1 is attached, and the standard (left-right) direction of the target 3 is matched with the direction which is expected to be the standard direction of the radar 1 (that is, the horizontal direction). At the same time, the environmental condition is arranged such that the reflectivity is nearly zero around the detection surface of the target 3. After this target setting process, the aforementioned command inputting device (not shown) is operated upon to carry out the axial adjustment process (shown in FIG. 10) which is a process of nearly automatically carrying out both the detection of axial displacement and its adjustment.

As shown in FIG. 2C, the target 3 to be used for the adjustment has a rectangular two-dimensional detection surface having a pair of side edges extending in the vertical direction. Its width L1 in the left-right direction is smaller than the width L2 in the left-right direction of the radar field of vision. The vertical extension (not indicated by symbol) of the target 3 corresponds to the maximum vertical displacement of the radar field of vision. In FIG. 3A, Case A shows the positional relationship when the radar field of vision is displaced upward by the maximum amount and Case C shows that when the radar field of vision is displaced downward by the maximum amount.

A pattern is formed according to this invention on the detection surface of the target 3 with a diagonally extending belt-like dark area 21 and bright flanking areas 22 and 23 on its left-hand and right-hand sides. Vertically elongated dark areas 25 and 26 are further provided, respectively extending upward from the top end and downward from the bottom end of the diagonal area 21. In the above, dark means that the area has a low reflectivity, say, by being painted in black and bright means that the area has a high reflectively, say, by being painted in white so as to strongly reflect light.

Figure 3B:
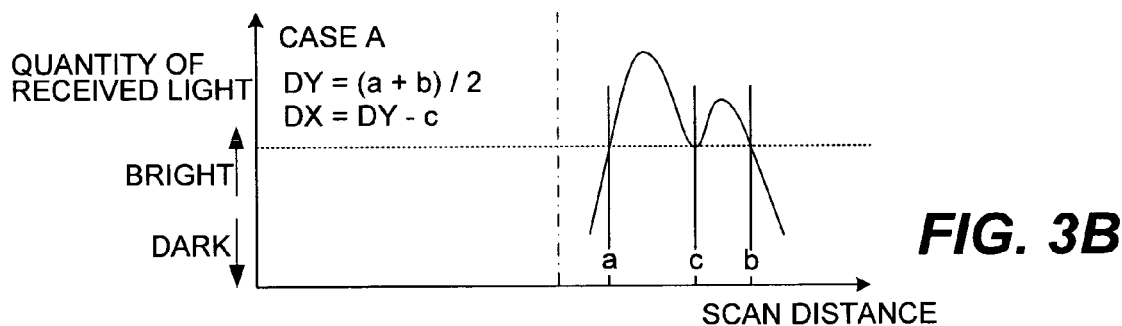
Figure 3C:
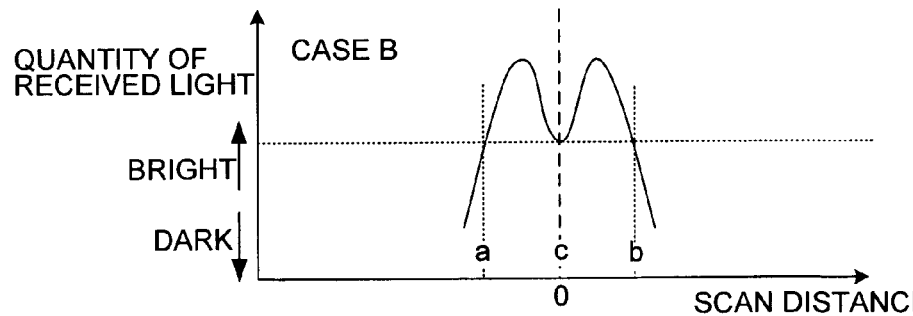
Figure 3D:
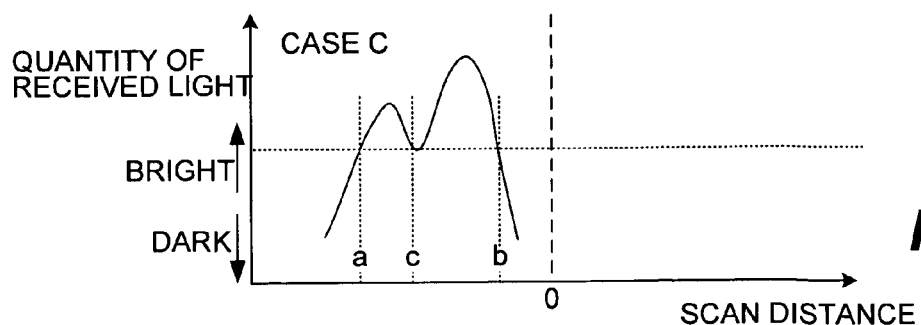

If the detection operation is carried out with the target 3 having such a surface pattern of dark and bright areas and with the detection area of the radar 1 set towards this detection surface (after the aforementioned target setting process has been carried out), the waveform of the quantity of the received reflected light against the standard scan direction becomes as shown in FIGS. 3B, 3C and 3D, showing an inverted-W pattern with two peaks corresponding to the pattern on the detection surface. On the basis of such a waveform, displacement of the detection area from the center of the detection surface (that is, the amount of displacement of the axis from the proper position of the radar 1 inclusive of its direction) can be calculated.

Explained more in detail with reference to FIG. 3A, if the scan distance corresponding to the position of the central valley (minimum) of the waveform with the two-peak shape is c, and if the scan distances corresponding to the positions where the quantity of received light is equal to that at the aforementioned valley point are a and b, the horizontal displacement of the center position of the radar field of vision from the center position of the target 3 may be obtained as $DY=(a+b)/2$ and the vertical displacement as $DX=DY-c$.

This is because the waveform of the received signal intensity drops to a minimum (such as in a V-shape or in a U-shape) in the dark areas 21, 25 and 26 and becomes higher in the bright areas 22 and 23, dropping further toward the outside (the environmental condition of the target 3 functioning as dark areas). Thus, the average $(a+b)/2$ of the scan distances a and b corresponding to the positions at which the quantity of received light become equal to that at the central valley corresponds to the center position CP in the left-right direction of the detection surface of the target 3. In other words, this average value (or a weighted average value) may be interpreted as the center position CP and the displacement in the standard direction.

If the displacement DY in the standard direction is zero as in Case B shown in FIG. 3C, this means that the center position CP in the left-right direction of the detection surface of the target 3 is matching the zero-position of the scan distance (the position of the optical axis of the radar in the standard direction), or that $DY=CP=0$ and hence that the optical axis of the radar 1 is in the correct direction. If DY is positive as in Case A shown in FIG. 3B, the center position CP of the detection surface of the target 3 is on the right-hand side of the center of the radar field of vision (or its optical axis). If DY is negative as in Case C shown in FIG. 3D, on the other hand, this means that the center of the radar field of vision (its optical axis) is displaced to the right.

Since the scan distance c represents the center line position of the dark areas 21,25 and 26 in the standard direction, the difference (DY−c) between the displacement in the standard direction DY corresponding to the center position CP of the detection surface and this scan distance c corresponds to the distance DL in the standard direction shown in FIG. 3A from the center position of the detection surface to the position of the center line of the dark areas 21, 25 and 26. Since the area 21 is tilted uniformly with respect to the vertical direction, the distance DL varies theoretically proportional to the displacement DX in the perpendicular direction corresponding to the vertical displacement of the radar field of vision. Thus, the aforementioned difference (DY−c), or a value obtained by multiplying it by a specified factor, may be interpreted as the displacement DX in the perpendicular direction.

If DX is zero as in Case B shown in FIG. 3C, this means that the center position of the detection surface of the target 3 in the vertical direction matches the position in the vertical direction of the optical axis of the radar 1, and hence that the optical axis of the radar 1 is at the right position in the vertical direction. If DX is negative as in Case A shown in FIG. 3B, the center of the target 3 is below the center of the radar field of vision, or that the center of the radar field of vision (or its optical axis) is displaced upward. If DX is positive as in Case C shown in FIG. 3D, it means that the radar field of vision (or its optical axis) is displaced downward.

Since the two end areas 25 and 26 are not tilted, the distance DL corresponding to these areas does not vary proportional to the vertical displacement of the radar field of vision. As a result, the calculated value of DX may become somewhat inaccurate (or somewhat smaller) in these areas. Since these are areas where the radar field of vision is displaced by a large distance, it is within the range of error. Alternatively, after a position adjustment is carried out corresponding to the calculated displacement DX in the perpendicular direction, the displacement DX in the perpendicular direction may be calculated again at the same time to carry out another adjustment of position (for example, by repeating the process to be described below with reference to FIG. 11) such that an accurate value of displacement can be obtained eventually and hence an accurate adjustment becomes possible. In practice, therefore, there is hardly any problem.

The axial displacement in the direction of rolling (or the angular displacement θ) can also be calculated by using the target 3.

Figure 4A:
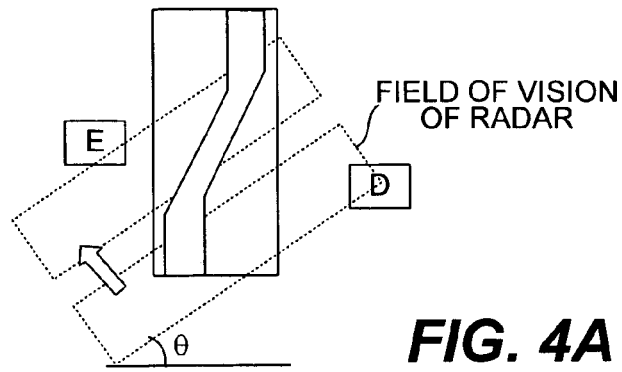
FIGS. 4A, 4B, 4C, 4D, 4E and 4F are for explaining the principle of axial adjustment in the rolling direction of the radar.

The target is initially placed such that the detection area of the radar 1 is pointed to the detection surface of the target 3, for example, by the aforementioned target setting process, although the detection surface need not necessarily be in front of the radar 1. Measurements are then taken only by a scan operation in the standard direction of the radar 1 to obtain the center position CP1 of the detection surface in the left-right direction by the principle described above. Thereafter, the detection area of the radar 1 (or the radar field of vision) is changed in the perpendicular direction as shown in FIG. 4A (from Case D to Case E) by a scanning operation of the radar 1 in the perpendicular direction or by changing the angle of attachment of the radar 1 and the same measurement operation as described above is repeated to obtain the center position CP2 of the detection surface in the left-right direction.

Figure 4B:
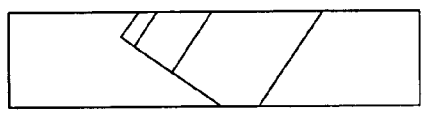
Figure 4C:
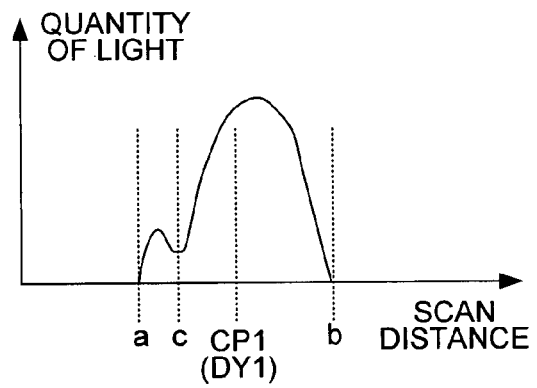
Figure 4D:
Figure 4E:
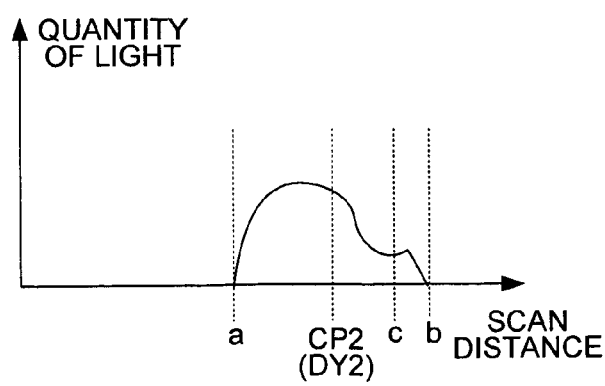

Explained more in detail, the target will appear as shown in FIG. 4B in Case D and hence the distribution curve of the quantity of received reflected light will be as shown in FIG. 4C, while the same target will appear as shown in FIG. 4D in Case E and the distribution curve will be as shown in FIG. 4E. The aforementioned center positions CP1 and CP2 are therefore respectively at the position given by (a+b)/2 in FIGS. 4B and 4D, as indicated therein.

The direction and magnitude of the angular displacement θ can now be calculated from the difference between CP1 and CP2 thus obtained, or the change in the center position of the detection surface in the left-right direction as seen from the radar 1. Let us now assume that the angular displacement θ is defined as shown in FIG. 4A. If the detection area of the radar 1 is moved upward and the center position of the target 3 in the left-right direction is seen to have moved to the right, for example, it can be concluded that there is an angular displacement θ in the counter-clockwise direction as shown in FIG. 4A because of the relationship as shown in Table 1 between the directions of changes of position of the optical axis of the radar 1 and the center of the target as observed by the sensor.

TABLE 1

| DIRECTION OF MOVING OPTICAL AXIS OF RADAR | MOTION OF CENTER OF TARGET OBSERVED BY SENSOR | DISPLACEMENT IN DIRECTION OF ROLLING |
| --- | --- | --- |
| UP | LEFT | CLOCKWISE |
|  | RIGHT | COUNTER-CLOCKWISE |
| DOWN | LEFT | COUNTER-CLOCKWISE |
|  | RIGHT | CLOCKWISE |

Figure 4F:
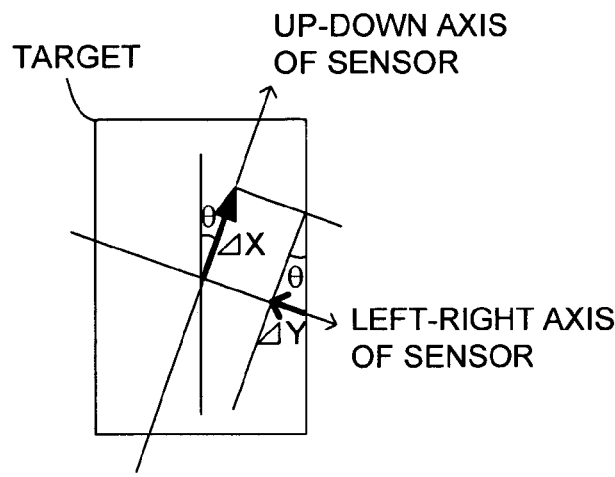

As shown in FIG. 4F, furthermore, there is a relationship $\Delta Y = \Delta X \cdot \tan \theta$ between the change $\Delta X$ in the position of the detection area of the radar 1 in the perpendicular direction and the change $\Delta Y$ (=CP2−CP1) in the center position of the target 3 in the left-right direction measured at the time. Thus, the angular displacement θ can also be quantitatively obtained from this relationship.

Next, the operations for axial adjustment of the monitoring apparatus described above are explained in the order of the control processing. As a command for the execution of axial adjustment is inputted through the aforementioned command inputting device, the control process shown by the flowchart of FIG. 10 is carried out by a control processing system including the control circuit 17 and the judging device 4 (or a personal computer connected from outside).

To start, the radar 1 and the camera 2 are operated several times to determine adjustability (Step S1), for example, by examining whether or not the distance to an object measured by the radar is outside a specified range. Adjustability signal B is outputted, if it is determined to be outside the range, to indicate that the position of the target 3 is abnormal and axial adjustment is impossible to perform. It is also determined whether an image of the preliminarily set target is found among the images taken by the camera 2 and, if there is none, adjustability signal A is outputted, indicating that the target 3 is not set and hence axial adjustment cannot be carried out.

In Step S2, it is determined whether or not it has been decided impossible to carry out axial adjustment on the basis of the results of measurement by the radar 1, or whether or not adjustability signal B has been outputted to indicate impossibility of adjustment. If it is impossible to adjust (YES in Step S2), the routine proceeds to Step S12. If it is not impossible (NO in Step S3), the routine proceeds to Step S3 wherein it is determined whether or not it has been decided impossible to carry out axial adjustment on the basis of the image taken by the camera 2, or whether or not adjustability signal A has been outputted. If it is impossible to adjust (YES in Step S3), the routine proceeds to Step S12. If it is not possible (NO in Step S3), the routine proceeds to Step S4 wherein a subroutine to be described below is carried out and the routine proceeds to Step S5.

In Step S5, it is determined whether or not the angular displacement θ of the radar 1 in the direction of rolling was calculated during the processing of Step S4 (in Step S30 to be described below). If it has already been calculated (YES in Step S5), the routine proceeds to Step S6. If it has not been calculated (NO in Step S5), the routine proceeds to Step 12.

In Step S6, adjustment of optical axis is carried out to change a parameter for setting the detection area such that the calculated angular displacement θ of the radar 1 is corrected. This may be carried out by software in the way described above. The angular displacement θ may be changed by adjusting the angle of attachment of the radar 1 either manually or by a mechanical operation.

In Step S7 after Step S6, images are taken by the camera 2 and a process of optical axis recognition (to be described below) for the camera 2 is carried out on the basis of the image data of the target 3 thereby obtained or the measured distance (or distance information DLT to be explained below) to the target 3 obtained by the operation of the radar 1 in Step S1 or S4.

In Step S8 after Step S7, display of a parameter such as data on the displacement of the optical axis of the camera 2, the value of angular displacement (to be described below) based on the parameter, etc. is made on a display device (not shown) that is connected.

In Step S9 after Step S8, it is determined whether or not the adjustment of the optical axis of the camera 2 is completed, or the aforementioned angular displacement has become smaller than a specified allowable value. If it is determined to have been completed (YES in Step S9), the routine proceeds to Step S14 and then concluded. If it is determined not to have been completed (NO in Step S9), the routine proceeds to Step S10 wherein a request for adjustment of the optical axis of the camera is switched on, which is to say that a request is displayed for the operator to have the orientation of the optical axis of the camera 2 to be adjusted by physically changing it.

In Step S11 after Step S10, the change effected on the optical axis of the camera 2 is ascertained and then the process returns to Step S9.

In Step S12, a display is made to the effect that the adjustment of the optical axis is not possible and the process returns to Step S1.

In Step S13, since the angular displacement θ in the direction of rolling is not calculated, the position of the detection area of the radar 1 in the perpendicular direction is changed and the measurements by scanning in the standard direction are continued in order to calculate the angular displacement 0 in the direction of rolling by the method described above.

In Step S14, the request switched on in Step S10 is switched off.

Figure 11:
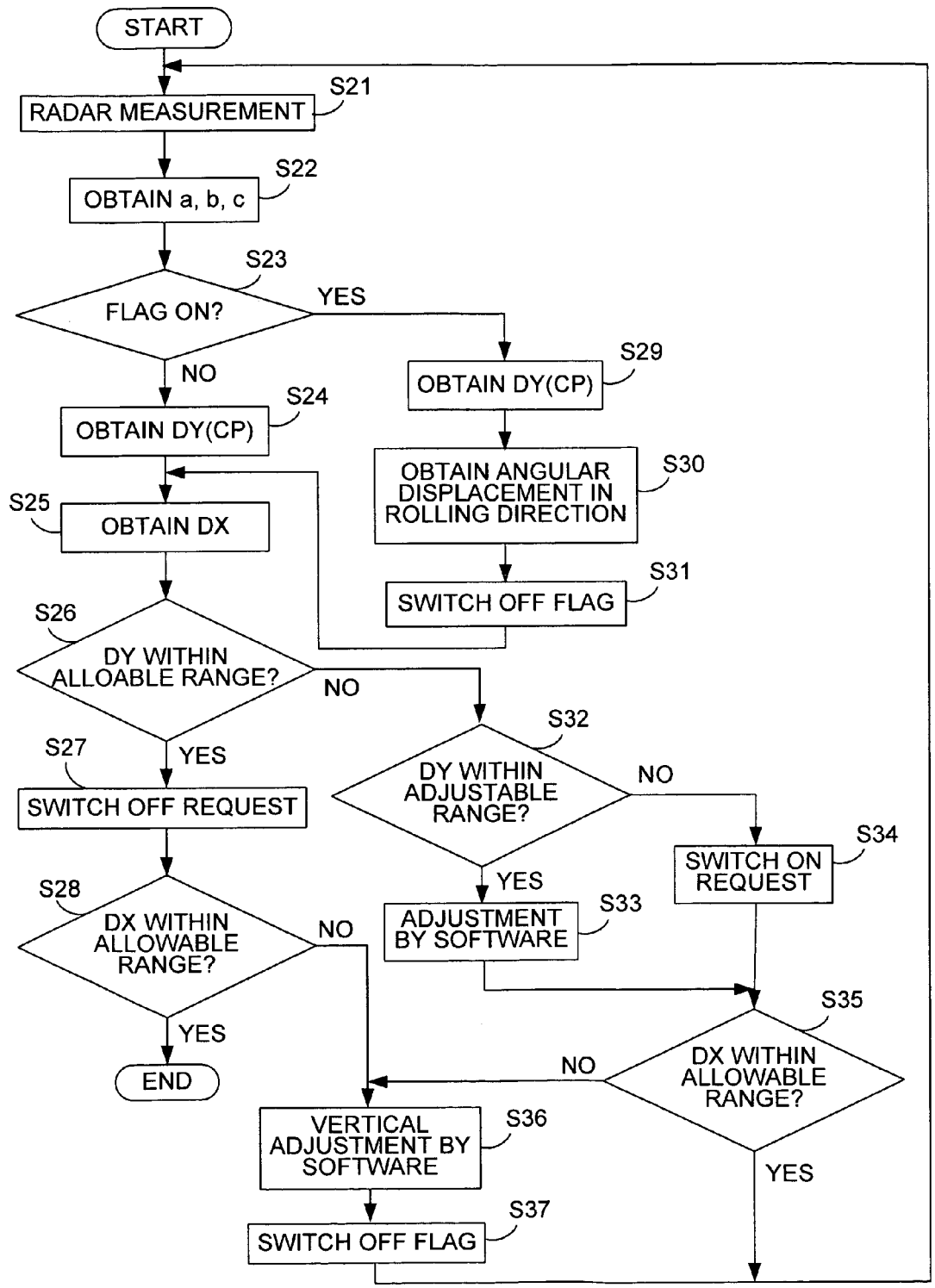
FIG. 11 is a flowchart of a subroutine included in the main routine of FIG. 10.

Next, the aforementioned subroutine in Step S4 for the adjustment of the optical axis of the radar 1 is explained in detail with reference to FIG. 11.

In Step S21 as the subroutine is started, the radar 1 is scanned in the standard direction to carry out measurements such that waveform data of reflected light (showing the change in the quantity of light with the scan distance) from the target 3 as well as its background are obtained. In Step S22 after Step S21, aforementioned scan distances c, a and b are determined from the obtained waveform.

In Step S23 thereafter, the up-down adjustment flag (to be described below) is checked. If it is on (YES in Step S23), the subroutine proceeds to Step S29. If it is not on (NO in Step S23), the subroutine proceeds to Step S24.

In Step S24, the values of scan distance obtained in Step S22 are used to calculate the values of DY and CP as described above. The value of DX is obtained in Step S25 after Step S24.

In Step S26 after Step S25, it is determined whether or not the value of displacement DY in the standard direction obtained in Step S24 is within a specified range. If it is within this range (YES in Step S26), the subroutine proceeds to Step S27. If otherwise (NO in Step S26), the subroutine proceeds to Step S32. In Step S27, a request to be described below, made in Step S34 for adjustment in the left-right direction (display), is switched off and the subroutine proceeds to Step S28.

In Step S28, it is determined whether or not the value of displacement DX in the perpendicular direction obtained in Step S24 is within a specified range. If it is within this range (YES in Step 28), this series of operations is terminated. If otherwise (NO in Step S28), the subroutine proceeds to Step S36.

In Step S29, a new value of the center position CP2 in the standard direction is obtained from the scan distances obtained in Step S22 which was carried out just previously while the value of the center position CP1 obtained in Step S24 in the previous sequence is kept. In Step S30 after Step S29, the angular displacement θ of the radar 1 in the direction of rolling is obtained as described above from the values of CP1, CP2 and the change ΔX stored in Step S37. In Step S31 thereafter, the flag set up in Step S37 is switched off and the subroutine proceeds to Step S25.

In Step S32, it is determined whether or not the value of displacement DY in the standard direction is within the range in which the adjustment of the optical axis by software described above is possible. If it is within this range (YES in Step S32), the subroutine proceeds to Step S33. If otherwise, the subroutine proceeds to Step S34.

In Step S33, the value of DY obtained in Step S24 is corrected by the aforementioned adjustment of the optical axis by software. In Step S34, a request is displayed to the user to carry out the type of correction on the value DY not possible by software by physically changing the attachment of the radar 1, together with data on the displacement of the axis. The request may be made for such a correction to be carried out not necessarily by the user. A mechanism for mechanically changing the angle or position of attachment of the radar 1 may be provided such that a request may be outputted for automatically operating such a mechanism for effecting the requested adjustment.

In Step S35 after Step S33 or S34, a judgment done similarly in Step S28 is made, that is, the subroutine returns to Step S1 and repeats the subsequent steps if DX is within a specified range and proceeds to Step S36 if otherwise.

In Step S36, the displacement DX obtained in Step S25 is corrected by software. As explained with reference to Steps S32 and S34, however, a mechanism may be provided for carrying out such correction physically. In Step S37 thereafter, the value of the change ΔX due to the correction in Step S36 is stored and after the up-down adjustment flag is switched on, the subroutine returns to Step S21.

Next, the principle of the process of optical axis recognition for the camera 2 (referenced above in Step S7) is explained with reference to FIGS. 5–8. Although targets different from the one explained above with reference to FIGS. 2C and 3A are illustrated in FIGS. 5–9, they are functionally the same and hence will be indicated by the same numeral (3) and will be explained as if they are the same. In reality, completely identical targets may be used for correcting the optical axes of the radar 1 and the camera 2.

Figure 5:
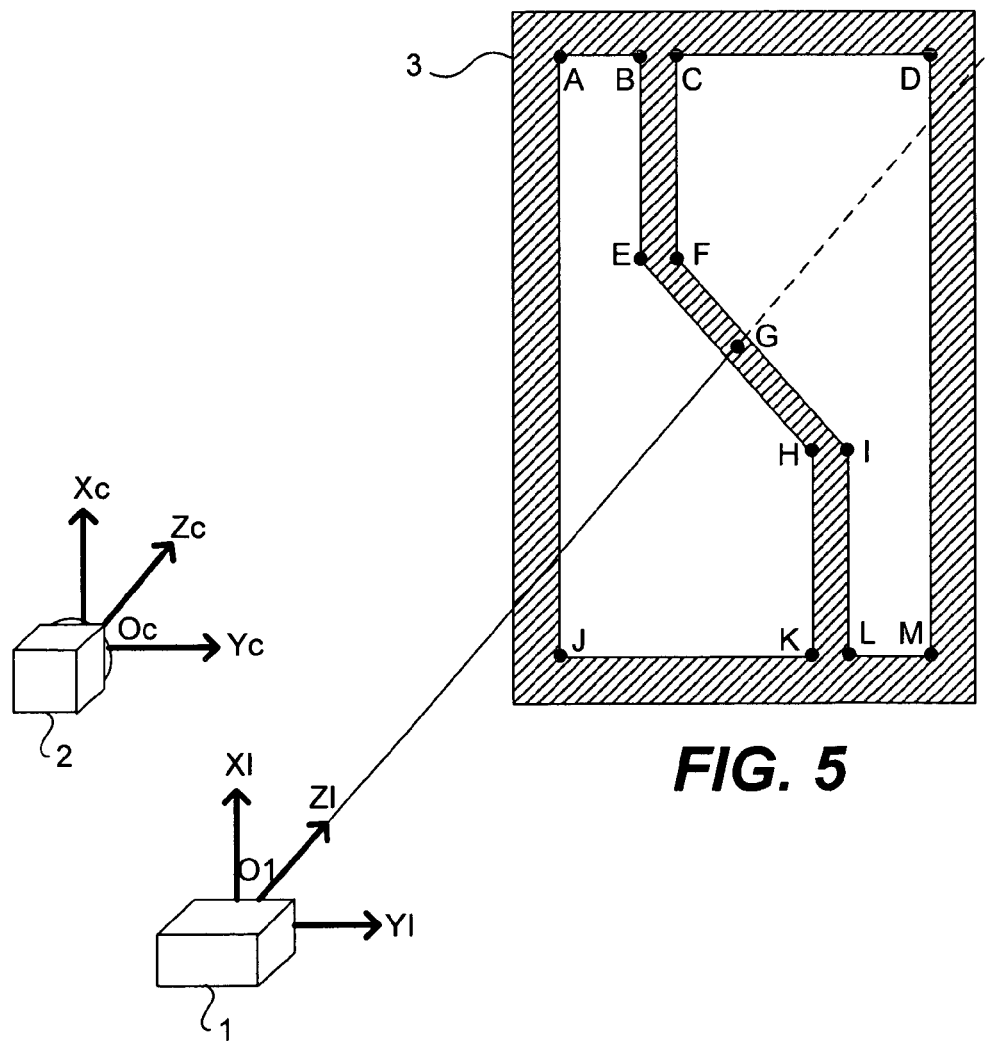
FIG. 5 is a drawing for showing the relationship between a target for adjustment and coordinate systems for the two sensors.

By the time this process is started, the adjustment of the optical axis of the radar 1 is already completed, inclusive of adjustment in the direction of rolling. Thus, if a radar-fixed coordinate system (X1, Y1, Z1) affixed to the radar 1 is defined as shown in FIG. 5, the Z1-axis which coincides with the optical axis of the radar 1 passes through the center point G of the target 3 and the X1-Y1 plane is parallel to the detection surface of the target 3. Since the distance DLT from the radar 1 (at the origin O1) to the target 3 (or its center point G) is already measured at the time of axial adjustment of the radar 1 and the dimensions of the target 3 and of its pattern are known, the coordinates of various characteristic points A–M on the target 3 are easily determined. Thus, if the coordinates of these characterizing points with reference to a camera-fixed coordinate system (Xc, Yc, Zc) affixed to the camera 2 are measured, or if the positions of these characteristic points on the image surface of the camera 2 are determined, the positional relationship between the optical axes of the radar 1 and the camera 2 can also be determined.

Since the lens of an ordinary camera has distortions, a correction (or a coordinate transformation) is usually made on the data actually obtained from a camera. For the simplicity of disclosure, however, it will be herein assumed that there is no such distortion to be corrected. The lens distortion coefficient which serves as a parameter for the lens distortion may be determined by a known method, for example, by setting at a specified distance in front of the camera a square-shaped target with a lattice pattern on its surface and analyzing its image data. Such a parameter may be preliminarily obtained for each camera or model of camera and stored for reference.

The relationship between the coordinates (Xw, Yw, Zw) of a point M in a specified fixed three-dimensional coordinate system and the coordinates (u, v) of a point m on an image taken of point M by a camera is expressed as follows:

$$s\tilde{m} = A[Rt]\tilde{M}\tilde{m} = \begin{bmatrix} u \\ v \\ 1 \end{bmatrix}, \tilde{M} = \begin{bmatrix} Xw \\ Yw \\ Zw \\ 1 \end{bmatrix} \quad (1)$$

where scale s is a coefficient, A is a 3×3 matrix representing an inner parameter of the camera, R and t are external parameters representing the six spatial degrees of freedom, respectively being a 3×3 matrix and a 3×1 matrix. In the above, R represents the rotary components of the camera and t represents the translational components. If the coordinate system (Xw, Yw, Zw) is considered to be the radar-fixed coordinate system (X1, Y1, Z1) and a camera-fixed coordinate system (Xc, Yc, Zc) affixed to the camera 2 as shown in FIG. 5 is defined, aforementioned matrix R is a parameter corresponding to the relative angular displacement (orientation) between the radar-fixed coordinate system (X1, Y1, Z1) and the camera-fixed coordinate system (Xc, Yc, Zc) affixed to the camera 2, or the displacement (or the degree of non-parallelism) between the radar 1 and the camera 2. Aforementioned matrix t in this case is a parameter corresponding to the positional difference between the radar 1 and the camera 2. In the case of the example shown in FIG. 1A, the camera 2 is vertically above the radar 1. Such difference in height or in position in the horizontal direction is reflected in matrix t.

Matrix A is determined by the structure of the camera and is of the form as shown below:

$$A = \begin{bmatrix} \alpha & \gamma & cu \\ 0 & \beta & cv \\ 0 & 0 & 1 \end{bmatrix} \quad (2)$$

where (cu, cv) is the origin of the image coordinate system (usually the center point of the image surface), $\alpha$ and $\beta$ are scaling factors along the u- and v-axes of the image coordinate system and $\gamma$ is the distortion curvature of the u-axis and v-axis.

Equation (1) may be rewritten as follows by matrix multiplication:

$$s\tilde{m} = P\tilde{M} \quad (3)$$

This means that if the coordinates of point M and matrix P are known, the position on the image surface where it is projected is represented as a multiple of its scale s. The scale s is obtained on the basis of the distance between the point M and the camera (a value corresponding to aforementioned distance DLT). Matrix P is a 3×4 matrix and is normally referred to as the projection matrix. In the case of the present example, a coordinate conversion parameter between the radar 1 and the camera 2 is obtained from the coordinates of the characteristic points on the radar-fixed coordinate system. Matrix P is 3×4 and is usually referred to as the projection matrix. In the case of the present example, the coordinate conversion between the radar 1 and the camera 2 can be obtained by obtaining this projection matrix from the coordinates of these characteristic points on the image surface of the camera 2.

Equation (4) is obtained by further transforming Equation (3):

$$Zp=0 \quad (4)$$

where Z is a 2×12 matrix comprised of the three-dimensional point M and the two-dimensional point m and p is a camera parameter, having the projection matrix P rewritten in a vector form as follows:

$$p=[p_{11}, p_{12}, p_{13}, \ldots, p_{34}]^T$$

After the three-dimensional point M and the two-dimensional point m come to be known, the camera parameter can be obtained by solving the following optimization problem:

$$\|Zp\|^2 \to \min, \|p\|^2 = 1 \quad (5)$$

If the vector p is calculated, it is rewritten in the form of the projection matrix P.

After projection matrix P is thus obtained, it is written in the form of Equation (6), dividing into one 3×3 matrix and another 3×1 matrix:

$$P = \begin{bmatrix} P_{11} & P_{12} & P_{13} & | & P_{14} \\ P_{21} & P_{22} & P_{23} & | & P_{24} \\ P_{31} & P_{32} & P_{33} & | & P_{34} \end{bmatrix} = [AR \mid At] \quad (6)$$

As can be understood from Equation (1), the 3×3 matrix portion is the product of matrix multiplication AR and the 3×1 matrix is the product of matrix multiplication At.

If this 3×3 matrix is divided by Cholesky matrix decomposition into a quadrature matrix and an upper triangular matrix and if the whole of this upper triangular matrix is divided by its (3,3) element, matrix A in the same form as shown in Equation (2) can be obtained as inner parameter. Since this inner parameter (matrix A) is a characteristic of the structure of the camera 2, it is not necessary to obtain it from the data on the target 3 in aforementioned Step S7. Normally, it may be obtained preliminarily and set for each camera or each model of camera. For example, the same target may be used in the aforementioned process for obtaining the lens distortion to obtain this matrix A.

The external parameter Rt may be obtained similarly, that is, by obtaining the projection matrix. The external parameter Rt is obtained after the optical axis of the radar 1 is adjusted by using the same target 3 in Step S7. In this manner, the external parameter which forms the coordinate conversion parameter between the optical axes of the radar 1 and the camera 2 can be obtained accurately and easily.

Firstly, the coordinates of the characteristic points A–M on the target 3 in the radar-fixed coordinate system (X1, Y1, Z1) can be obtained as shown in Equation (7):

$$(X1, Y1, Z1) = (x1_A, y1_A, D1t), (x1_B, y1_B, D1t), (x1_C, y1_C, D1t), \ldots (x1_M, y1_M, D1t) \quad (7)$$

Next, the coordinates of each of the characteristic points (hereinafter except for the center point G) on the image surface. They may be obtained by image processing (such as edge extraction, corner extraction and binarization) of the image of the target taken by the camera 2. For simplifying the process, however, they may be obtained as follows.

For an image of the target 3 taken by a camera 2 as shown in FIG. 6, a request is made to the user to specify the four corners of the area surrounding the characteristic points A–M for extracting the area inside these four corners as shown in FIG. 7A. This may be done, for example, by taking the image of the target 3 into a personal computer connected to the monitoring apparatus and operating the mouse of this computer as shown in FIG. 6. Known processes of edge extraction and filtering may be carried out on the image data thus extracted to generate an edge image as shown in FIG. 7B. The Hough transformation is further carried out to detect straight lines as shown in FIG. 7C, and the crossing points of these extracted straight lines are obtained. The coordinates of those of the crossing points corresponding to the characteristic points A–M as shown circled in FIG. 8A are registered. This may be done by making a request to the user as explained above. As a result of such an operation, the coordinates of the points indicated by black squares as shown in FIG. 8B are obtained. The equation which shows these coordinates may be as shown below:

$$(u,v)=(u_A,u_B), (u_B,v_B), (u_C,v_C), \ldots, (u_M,v_M) \quad (8)$$

Next, the projection matrix P as shown by Equation (3) is obtained for the target 3. In other words, a projection matrix is obtained for defining the positional relationship between the three-dimensional coordinates shown by Equation (7) and the two-dimensional coordinates shown by Equation (8) of each of the characteristic points A–M. The method of obtaining such a projection matrix is as explained above for the matrix A (inner parameter).

Thereafter, external parameters (matrices R and t) are extracted from the projection matrix thus obtained. This may be done by Equation (9) given below from the relationship given by Equation (6):

$$\begin{cases} R = A^{-1} \cdot \begin{bmatrix} P_{11} & P_{12} & P_{13} \\ P_{21} & P_{22} & P_{23} \\ P_{31} & P_{32} & P_{33} \end{bmatrix} \\ t = A^{-1} \cdot \begin{bmatrix} P_{14} \\ P_{24} \\ P_{34} \end{bmatrix} \end{cases} \quad (9)$$

where $A^{-1}$ is the inverse of matrix A obtained earlier. The external parameters based on the target 3 for the radar 1 are thus obtained.

Next, the principle of the process for recognizing the change (in orientation) in the optical axis of the camera 2 (the process of aforementioned Step S11) is explained with reference to FIG. 9. The rotation matrix R of the aforementioned external parameters may be written in terms of the rotations around the coordinate axes of the camera-fixed coordinate system. If the detection area of the camera 2 (the second detection area) has rotated by $\theta$ around the Zc-axis, by $\phi$ around the Xc-axis and by $\rho$ around the Yc-axis, the projection matrix will be as shown by Equation (10):

$$r_t = \begin{bmatrix} r_{11} & r_{12} & r_{13} \\ r_{21} & r_{22} & r_{23} \\ r_{31} & r_{32} & r_{33} \end{bmatrix} \quad (10)$$

where:

$r_{11} = \cos \theta_t \cos \rho_t$
$r_{21} = -\sin \theta_t \cos \rho_t + \cos \theta_t \sin \phi_t \sin \rho_t$
$r_{31} = \cos \phi_t \sin \rho_t$
$r_{12} = \sin \theta_t \cos \phi_t$
$r_{22} = \cos \theta_t \cos \phi_t$
$r_{32} = -\sin \phi_t$
$r_{13} = -\cos \theta_t \sin \rho_t + \sin \theta_t \sin \phi_t \cos \rho_t$
$r_{23} = \sin \theta_t \sin \rho_t + \cos \theta_t \sin \phi_t \cos \rho_t$
$r_{33} = \cos \theta_t \cos \rho_t$ By comparing this with the elements of Equation (9), the angles $\theta$, $\phi$ and $\rho$ of the optical axis of the camera 2 can be obtained as shown by Equation (11).

$$\begin{cases} \theta_t = \tan^{-1} \frac{r_{12}}{r_{22}} \\ \phi_t = -\sin^{-1} r_{32} \\ \rho_t = \tan^{-1} \frac{r_{31}}{r_{33}} \end{cases} \quad (11)$$

In aforementioned Step S11, the matrix R was newly obtained and new angles of the optical axis were calculated from Equation (11) to obtain the change in the orientation of the optical axis of the camera 2 (or the change in the orientation of the detection area of the camera 2). For simplifying the process, however, this change in the angles of the optical axis may be obtained as follows.

As shown in FIG. 9, let us assume, for example, that the characteristic point A on the image surface has moved to a new position A' by an angular adjustment. A new rotation matrix R after the adjustment can be obtained from this positional change of the characteristic point A.

Explained more in detail, from the moment when the response in aforementioned Step S9 became negative (or when it came to be judged necessary to adjust the optical axis of the camera) until when it becomes positive (or when it subsequently comes to be judged that the adjust of the optical axis has been completed) images are taken periodically by the camera 2 and the coordinates of a plurality of characteristic points after the change in position are obtained after each scan (indicated by subscripts t). The rotation matrix $R_{t+1}$ corresponding to the angular change at the time is repeatedly obtained according to Equation (12):

$$R_{t+1} q_t = q_{t+1}$$

$$q_t = \begin{bmatrix} u_{t,0} & u_{t,1} & & u_{t,n} \\ v_{t,0} & v_{t,1} & \cdots & v_{t,n} \\ f & f & & f \end{bmatrix}, q_{t+1} = \begin{bmatrix} u_{t+1,0} & u_{t+1,1} & & u_{t+1,n} \\ v_{t+1,0} & v_{t+1,1} & \cdots & v_{t+1,n} \\ f & f & & f \end{bmatrix}$$

where $u_{t,0}, \ldots, u_{t,n}$ and $v_{t,0}, \ldots, v_{t,n}$ are the coordinates of the n characteristic points at scan t on the image surface and f represents the focal length of the camera 2. Similarly, $u_{t+1,0}, \ldots, u_{t+1,n}$ and $v_{t+1,0}, \ldots, v_{t+1,n}$ are the coordinates of the n characteristic points at the of next scan t+1 on the image surface, and the estimated value of the rotation matrix $R_{t+1}$ at scan t+1 can be solved as the optimization problem of Equation 13:

$$\|R_{t+1} q_t - q_{t+1}\|^2 \to \min \quad (13)$$

The characteristic points after the move can be referenced as follows.

After an image of a neighborhood of a characteristic point at scan t is registered as a template, the surroundings is investigated from an image at next scan t+1 by using Equation (14) to look for the position where ssd of FIG. (14) takes an maximum value and to identify the coordinates of the characteristic point after the moving:

$$ssd = \frac{\sum_i \{f(u_i, v_i) - \bar{f}\} \cdot \sum_j \{g(u_j, v_j) - \bar{g}\}}{\sqrt{\sum_i \{f(u_i, v_i) - \bar{f}\}^2} \cdot \sqrt{\sum_j \{g(u_j, v_j) - \bar{g}\}^2}} \quad (14)$$

$$\bar{f} = \frac{1}{M}\sum_{i=0}^{M-1} f(u_i, v_i), \bar{g} = \frac{1}{M}\sum_{i=0}^{M-1} g(u_i, v_i)$$

where f(u,v) and g(u,v) are the coordinates before and after the moving.

Next, after the rotation matrix $R_{t+1}$ corresponding to the angular change is determined as described above, changes in the angles in all directions $\Delta\theta_t$, $\Delta\phi_t$ and $\Delta\rho_t$ can be obtained from Equation (11). After that, these change values can be used to easily calculate the new orientation of the optical axis of the camera at t+1, or the values of $\theta_{t+1}$, $\phi_{t+1}$ and $\rho_{t+1}$ from Equation (15) given bellow:

$$\begin{cases} \theta_{t+1} = \theta_t + \Delta\theta_t \\ \phi_{t+1} = \phi_t + \Delta\phi_t \\ \rho_{t+1} = \rho_t + \Delta\rho_t \end{cases} \quad (15)$$

In aforementioned Step S9, every time a new orientation of the optical axis of the camera is obtained, it is compared with a specified allowable value $\epsilon$. If each angle becomes less than this value, as shown by Equation (16) at the time of scan (t+s), it is considered that the adjustment of the optical axis of the camera has been completed.

$$\begin{cases} |\theta_{t+s}| \leq \epsilon \\ |\phi_{t+s}| \leq \epsilon \\ |\rho_{t+1}| \leq \epsilon \end{cases} \quad (16)$$

By the control processing explained above, it is initially determined in Steps S1–S3 and S12 whether adjustment by either of the sensors is impossible or not. If an adjustment by either of the sensors is found to be impossible, the adjustment process is not carried out. Thus, the error of making adjustments under an impossible condition can be reliably avoided.

Next, detection and adjustment of the displacement of the axis of the detection area (the first detection area) of the radar 1 in the standard and perpendicular directions are automatically carried out by the processing of Step S4 (or Steps S21–S37) except, if the displacement in the standard direction is too large for adjustment by software according to the example described above, a request to the user is displayed (Steps S32 and S34) to make an adjustment until the displacement of the axis comes within an allowable range and this display is switched off (Steps S26 and S27). Thus, the user has only to vary the direction of attachment of the radar 1 while watching the display to make the adjustment.

In the processing of Step S4, if an adjustment in the perpendicular direction by software is carried out in Step S36, the up-down adjustment flag is switched on in Step S37 and a rolling displacement detection process is carried out in Steps S29–S31 branched from Step S23 to calculate the angular axial displacement θ in the rolling direction. If this rolling displacement detection process is not carried out and the angular displacement θ is not calculated, the detection process is carried out in Steps S5 and S13 and an adjustment process by software is carried out thereafter in Step S6 to correct the calculated axial displacement in the rolling direction.

After the axial adjustment for the radar 1 is thus completed, detection and correction of the axial displacement of the camera 2 (inclusive of the setting of parameters for coordinate transformation) are carried out in Steps S7–S11 and S14. If the axial displacement of the camera 2 (displacement in orientation from the optical axis of the radar 1, determined by the rotation matrix R which is a part of the aforementioned external parameter) is not within an allowable range, a request is displayed in Step S10 for an adjustment by physically changing the attachment until the displacement comes within the allowable range such that the request is withdrawn in Steps S9 an S14. This allows the user to easily correct the axial displacement by changing the direction of attachment of the camera 2 while observing the display.

As explained above, the two-dimensional axial adjustment both in the standard and perpendicular directions as well as the axial adjustment in the rolling direction of the radar 1 (the first detection area) and the axial adjustment in each direction of the camera 2 (the second detection area) (and in particular the orientation adjustment for making the optical axes of the camera 2 and the radar 1 parallel) can be carried out easily and accurately by means of a single target. Thus, not only can the accuracy of measurement of the monitoring apparatus be improved but also the time required for the adjustment and the cost of adjustment can be reduced. Furthermore, the position data on the target object of detection can be more correctly correlated between the sensors and the results of measurements by the sensors can be mutually utilized to take better advantage of the merits of the fusion type of detection.

According to the method of this invention for adjusting the optical axis of the radar 1, the detection surface of the target is patterned such that the waveform of the received signal intensity has a double-peaked shape with two peaks and a valley in between in a W-shape or inverted W-shape with respect to relative position such that the displacement of the optical axis in each direction inclusive of the rolling direction. This makes it possible to measure the displacement of this axis not only qualitatively but also quantitatively such that its correction can be effected accurately and reliably. Even if the beam width of the laser light of the radar 1 is large, as shown in FIG. 2C, such that the resolution of the radar 1 is relatively low, a correction can be effected equally accurately because it is effected on the basis of the waveform of (or the continuous change in) the quantity of received light in the scan direction. It is to be noted that the method according to aforementioned Japanese Patent Publication Tokkai 2000-75031 is disadvantageous in that the adjustment cannot be effected accurately if the radar resolution is rough.

Figure 12:
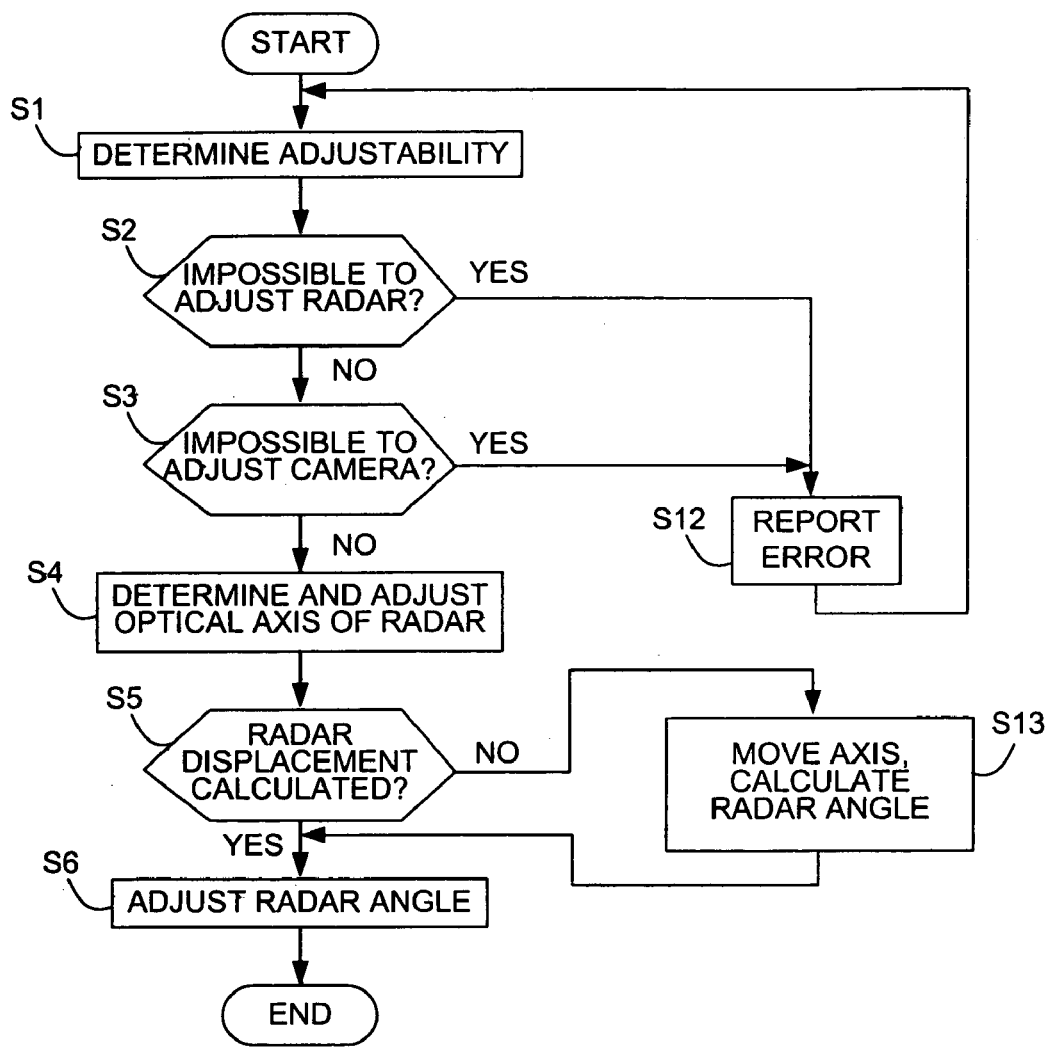
FIG. 12 is a flowchart of another routine for axial adjustment.

The invention is not limited by the example described above. Many modifications and variations are possible within the scope of the invention. The method of axial adjustment described above for adjustment in the rolling direction need not be applied to a monitoring apparatus of the fusion type but may also be applied to a single-unit monitoring apparatus, say, consisting only of a radar. In such a case, the control flowchart may be as shown in FIG. 12.

Figure 14A:
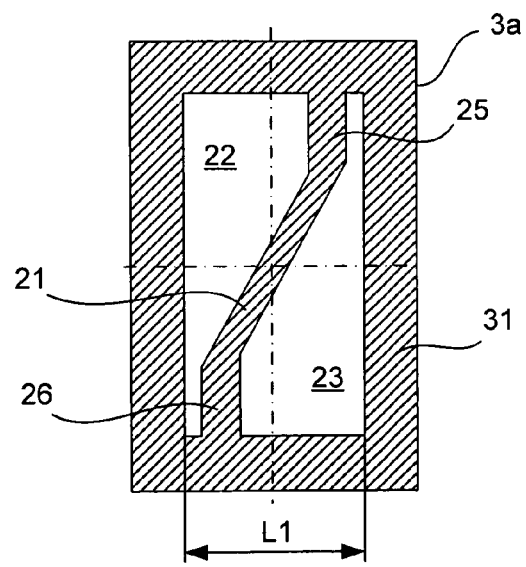
Figure 14B:
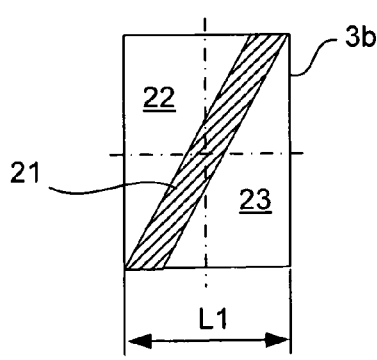
Figure 14C:
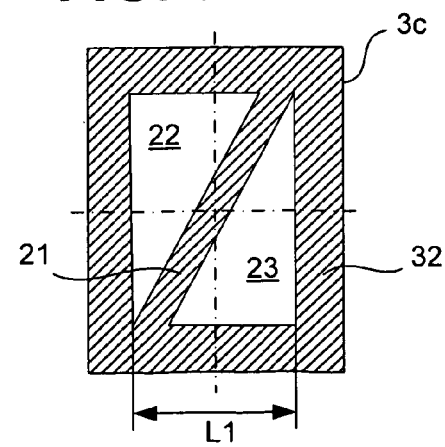

The surface pattern on the target 3 may be varied. FIG. 14A shows another target 3*a* according to this invention with a frame 31 of dark area. This pattern is advantageous in that the environment of the target need not be made dark in order to obtain a clear waveform as shown in FIGS. 3B, 3C and 3D. FIG. 14B shows still another target 3*b* having the vertically extending portions 25 and 26 of the target 3 eliminated. If the displacement in the vertical direction is large and the vertical extension of the target is large, the width of the target also increases accordingly. From the point of view of making the target compact, the pattern as shown above for the target 3 is more advantageous. FIG. 14C shows still anther target 3*c* having a dark frame part 32 added to the pattern on the target 3*b* of FIG. 14B.

Figure 13A:
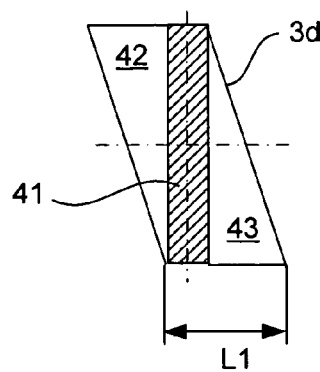
FIGS. 13A, 13B, 13C, 14A, 14B and 14C are drawings for showing targets with different surface patterns.

FIG. 13A shows a target 3*d* with a detection surface which is a parallelepiped with side edges oriented obliquely with respect to the vertical direction, its width L1 in the horizontal direction being smaller than the width L2 of the aforementioned detection area in the scan direction. The darkness pattern includes a vertically extending part 41 and two triangular bright areas 42 and 43 with high reflectivity on both sides of the vertical part 41.

With a target thus patterned, too, a waveform of quantity of received light having two peaks (an inverted W-shape) is obtained, and displacements DX and DY in two directions can be calculated from the scanned quantities c, a and b of the waveform as DY=c and DX=(a+b)/2−c.

Figure 13B:
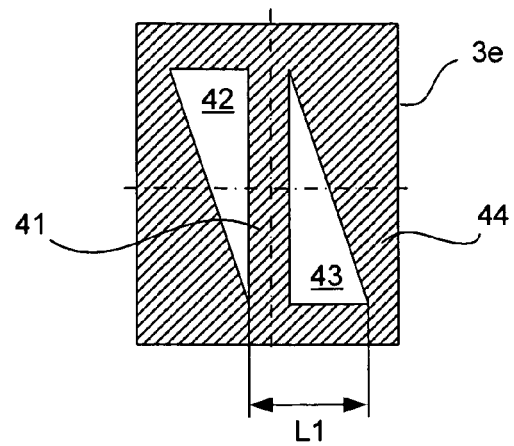
Figure 13C:
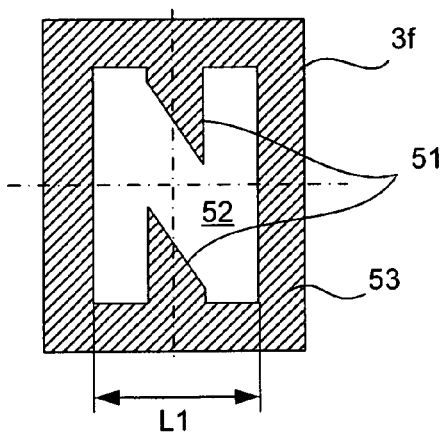

FIG. 13B shows another target 3*e* with a detection surface patterned similarly to the pattern shown in FIG. 13A except a dark frame is provided around the pattern of FIG. 13A. FIG. 13C shows still another target 3*f* with a detection surface patterned so as to include a diagonally cut vertically extended area 51. An N-shaped bright area 52 is generally surrounded by a dark frame part 53. With this target 3*f*, too, adjustment of the optical axis can be effected effectively for the same reason as explained above. As a variation, the dark frame part 53 may be removed.

Regarding all of the examples of target (3, 3*a*, 3*b*, 3*c*, 3*d*, 3*e* and 3*f*), the dark part and the bright part may be interchanged. Thus, what has been referred to as a "valley" regarding a two-peaked waveform includes, within the context of this invention" an upside valley, or a valley in the ordinary sense of the word appearing upside down.

As data to be displayed, the waveform of the quantity of received light may be displayed instead.

The work of setting the target of this invention may be adapted to be carried out automatically, for example, by using a robot or the like. Alternatively, a target may be kept in a set condition and vehicles or the like each carrying a monitoring apparatus may be transported on a conveyer and a positioning apparatus may be used for automatic positioning such that the target setting operation can be automatically carried out.

It is further reminded that the invention can be applied also to a radar adapted to scan only in one direction (the standard left-right direction) and to a distance-measuring apparatus using sound waves instead of electromagnetic waves such as laser light.

In summary, displacements of a monitoring apparatus in the rolling direction can be easily and accurately adjusted by a method of this invention. In the case of a monitoring apparatus of the fusion type using both a radar and a camera, in particular, the method of this invention makes it possible to adjust the directions of the axes of the two sensors quickly and correctly by using only one target for use for adjustment such that the correlation between the data measured by the two sensors can be accurately established and hence that the merits of the fusion type can be taken advantage of.

What is claimed is:

1. In a monitoring apparatus having a detection area for use in a measurement operation, said monitoring apparatus being adapted to receive waves from said detection area and to output data for specifying at least a position of a target object in said detection area at least from the quantity of the received waves, a method of adjusting axial displacement of said detection area in a rolling direction, said method comprising the steps of:

preparing a target, said target having a detection surface with a specified outer shape, a bright part with a higher reflectivity for waves and a dark part with a lower reflectivity than said higher reflectivity for waves being arranged over said detection surface in a specified pattern, wherein a waveform of wave quantity having a double-peaked shape corresponding to at least one selected from the group consisting of said pattern and said outer shape of said detection surface is obtained with respect to a standard position in a standard direction if said measurement operation is carried out in said standard direction by directing said detection area of said monitoring apparatus towards said detection surface;

setting said target in front of said monitoring apparatus by matching a standard direction of said detection surface with an expected standard direction of said detection area;

obtaining axial displacement of said detection area in said rolling direction by repeating said measurement operation at least twice by changing measurement position in a perpendicular direction which is perpendicular to said standard direction and by calculating each time a standard position of said detection surface in said standard direction from the waveform, and correcting said axial displacement by a correction step selected from the group consisting of adjusting an attachment angle of said monitoring apparatus and changing a parameter for setting said detection area.

2. The method of claim 1 wherein said outer shape of said detection surface includes a pair of side edges that are parallel to said perpendicular direction, wherein said detection surface has a smaller width in said standard direction than said detection area, wherein said pattern includes an elongated area extending over a center part of said detection surface and a pair of flanking areas on both sides of said elongated area, wherein either of said elongated area and said flanking areas is said dark area, the other being said bright area, and wherein said standard position is calculated from standard direction position data of points which are on opposite sides of said double-peaked shape and at which the measured quantity of received waves is the same as at said valley between said two peaks.

3. The method of claim 1 wherein said pattern includes an elongated area extending over a center part of said detection surface, a pair of flanking areas on both sides of said elongated area and a pair of background areas on both sides of said flanking areas in said standard direction, wherein either of said elongated area and said flanking and background areas is said dark area and the other being said bright area, wherein boundaries between said flanking and background areas on both sides in said standard direction are parallel to said perpendicular direction, wherein said parallel boundaries are separated by a distance that is smaller than the width of said detection area in said standard direction, and wherein said standard position is calculated from standard direction position data of points which are on opposite sides of said double-peaked shape and at which the measured quantity of received waves is the same as at said valley between said two peaks.

4. The method of claim 1 wherein said detection surface has a smaller width in said standard direction than said detection area, wherein said pattern includes an elongated area extending over a center part of said detection surface and a pair of flanking areas on both sides of said elongated area, wherein either of said elongated area and said flanking areas is said dark area, the other being said bright area, wherein said elongated area is parallel to said perpendicular direction, and wherein said standard position is calculated from standard direction position data at said valley of said double-peaked shape.

5. The method of claim 1 wherein said pattern includes an elongated area extending over a center part of said detection surface, a pair of flanking areas on both sides of said elongated area and a pair of background areas on both sides of said flanking areas in said standard direction, wherein either of said elongated area and said flanking and background areas is said dark area and the other being said bright area, wherein boundaries between said flanking and background areas on both sides in said standard direction are separated by a distance that is smaller than the width of said detection area in said standard direction, wherein said elongated area is parallel to said perpendicular direction, and wherein said standard position is calculated from standard direction position data at said valley of said double-peaked shape.

6. The method of claim 1 wherein the step of setting said target includes the step of setting environmental condition of said target so as to be of about same reflectivity as the reflectivity of either of said dark part and said bright part.

7. In a monitoring apparatus for carrying out a measurement operation by receiving waves from a first detection area in each of standard directional positions and comprising a radar that outputs data for determining at least the position of an object in said first detection area at least from the quantity of received waves and a camera for obtaining an image of a second detection area that overlaps with said first detection area, a method of adjusting orientations of said first and second detection areas, said method comprising the steps of:

setting a single target in an overlapping area where said first detection area and said second detection area overlap and adjusting said first detection area based on results of measurement of said target by said radar; and thereafter detecting axial displacement of said second detection area based on an image of said target taken by said camera, adjusting said second detection area and obtaining a parameter for coordinate transformation between said radar and said camera.

8. The method of claim 7 further comprising the steps, carried out by a processing device, of:

obtaining axial displacement data related to axial displacement of said first detection area or said second detection area based on said results of measurement by said radar or said image of said target taken by said camera;

causing said displacement data to be displayed on a display; and causing a user to change said first detection area or said second detection area while observing said display until the axial displacement of said first detection area or said second detection area comes to be within a specified range.

9. The method of claim 7 further comprising the steps of:

determining first adjustability based on said image of said target taken by said camera;

determining second adjustability based on said results of measurement by said radar;

determining whether or not axial adjustment is possible based on said first adjustability and said second adjustability; and not carrying out said axial adjustment of said first detection area and said second detection area if it is determined that said axial adjustment is not possible.

10. The method of claim 7 wherein said target has a detection surface with a specified outer shape, a bright part with a higher reflectivity for waves and a dark part with a lower reflectivity than said higher reflectivity for waves being arranged over said detection surface in a specified pattern, wherein a waveform of wave quantity having a double-peaked shape corresponding to at least one selected from the group consisting of said pattern and said outer shape of said detection surface is obtained with respect to a standard position in a standard direction if said measurement operation is carried out in said standard direction by directing said first detection area of said radar towards said detection surface, wherein said first detection area is adjusted by the steps of:

setting said target in front of said radar and setting environmental condition of said target so as to be of about same reflectivity as the reflectivity of either of said dark part and said bright part;

carrying out said measurement operation by scanning in said standard direction with said radar to obtain a waveform of wave quantity with said double-peaked shape and calculating axial displacement of said first detection area based on said waveform; and correcting said axial displacement by a correction step selected from the group consisting of adjusting an attachment angle of said radar and changing a parameter for setting said first detection area.

11. The method of claim 7 wherein said parameter is obtained by a processing device carrying the steps of:

detecting a plurality of characteristic points on said detecting surface of said target from said image taken by said camera;

determining coordinates of said characteristic points on said image; and determining axial displacement of said second detection area based on said determined coordinates.

12. The method of claim 11 wherein said coordinates are determined by said processing device carrying out the steps of:

causing said image taken by said camera to be displayed on a display;

determining a cut-out image of a specified region containing said characteristic points on said display according to an input by a user; and carrying out an image processing on said cut-out image.

13. The method of claim 11 wherein said characteristic points are at angles and corners of boundary lines of a brightness-darkness pattern formed on said detection surface of said target, said processing device further carrying out the steps of:
- carrying out an image processing to thereby extract straight lines from said image of said target taken by said camera;
- having said extracted straight lines displayed on a display; and
- thereafter determining coordinates on said image of those of crossing points of said straight lines indicated by a user.

14. The method of claim 11 wherein said second detection area is adjusted by said processing device carrying out the steps of:
- registering as a template a image of an environment of said characteristic points on said image of said target before adjustment; and
- searching the image of said template by normalized cross-correlation process to thereby obtain new coordinates of said characteristic points on said image after said adjustment from the image of said target after said adjustment.

* * * * *